(12) United States Patent
Kanaya et al.

(10) Patent No.: US 11,452,662 B2
(45) Date of Patent: Sep. 27, 2022

(54) WALKING ASSIST DEVICE

(71) Applicant: JTEKT CORPORATION, Osaka (JP)

(72) Inventors: Manabu Kanaya, Nara (JP); Yoshiyuki Shibata, Toyota (JP); Shinji Takeuchi, Okazaki (JP); Genki Murata, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 885 days.

(21) Appl. No.: 16/285,303

(22) Filed: Feb. 26, 2019

(65) Prior Publication Data

US 2019/0262217 A1    Aug. 29, 2019

(30) Foreign Application Priority Data

Feb. 27, 2018 (JP) .............................. JP2018-033293
Oct. 17, 2018 (JP) .............................. JP2018-195693

(51) Int. Cl.
*A61H 3/04* (2006.01)
*B62B 5/06* (2006.01)
(Continued)

(52) U.S. Cl.
CPC .............. *A61H 3/04* (2013.01); *A61H 1/0277* (2013.01); *A61H 1/0281* (2013.01);
(Continued)

(58) Field of Classification Search
CPC ...... A61H 3/04; A61H 1/0277; A61H 1/0281; A61H 2003/043; A61H 2003/046;
(Continued)

(56) References Cited

U.S. PATENT DOCUMENTS 6,296,263 B1 * 10/2001 Schultz .................... A61H 3/04
                                                      280/304.5
7,669,863 B2 * 3/2010 Steiner .................... A61H 3/04
                                                      280/648
(Continued)

FOREIGN PATENT DOCUMENTS

DE    10 2016 201 743 B3    4/2017
EP        2 845 785 A1      3/2015
(Continued)

OTHER PUBLICATIONS

Extended European Search Report dated Jun. 28, 2019 in Patent Application No. 19159119.7, 8 pages.

*Primary Examiner* — Garrett K Atkinson
(74) *Attorney, Agent, or Firm* — Oblon, McClelland, Maier & Neustadt, L.L.P.

(57) ABSTRACT

A walking assist device has a frame, a plurality of wheels, drive units, a battery, and a drive control unit that controls the drive units. The walking assist device also has: a pair of right and left movable handles that are grasped by a user and movable back and forth with respect to the frame in accordance with arm swing performed during walk of the user; handle guide units provided on the frame to guide the movable handles in a movable range that matches the arm swing performed during walk of the user; and a grasp portion state detection unit that detects the state of the movable handles. The drive control unit controls the travel speed of the walking assist device by controlling the drive units on the basis of the state of the movable handles which is detected using the grasp portion state detection unit.

14 Claims, 28 Drawing Sheets

(51) Int. Cl.
*A63B 23/12* (2006.01)
*A63B 21/00* (2006.01)
*A63B 23/035* (2006.01)
*A63B 23/04* (2006.01)
*A61H 1/02* (2006.01)
*B62B 3/00* (2006.01)
*B62B 5/00* (2006.01)
*B62B 5/04* (2006.01)
*A63B 22/00* (2006.01)
*A63B 21/005* (2006.01)
*A63B 22/20* (2006.01)

(52) U.S. Cl.
CPC ...... *A63B 21/4045* (2015.10); *A63B 21/4047* (2015.10); *A63B 23/03516* (2013.01); *A63B 23/03533* (2013.01); *A63B 23/03575* (2013.01); *A63B 23/04* (2013.01); *A63B 23/12* (2013.01); *A63B 23/1209* (2013.01); *B62B 3/00* (2013.01); *B62B 5/06* (2013.01); *A61H 2003/043* (2013.01); *A61H 2003/046* (2013.01); *A61H 2201/0173* (2013.01); *A61H 2201/0176* (2013.01); *A61H 2201/1207* (2013.01); *A61H 2201/1215* (2013.01); *A61H 2201/1261* (2013.01); *A61H 2201/14* (2013.01); *A61H 2201/1635* (2013.01); *A61H 2201/1664* (2013.01); *A61H 2201/1669* (2013.01); *A61H 2201/1676* (2013.01); *A61H 2201/5007* (2013.01); *A61H 2201/5061* (2013.01); *A61H 2201/5064* (2013.01); *A61H 2201/5069* (2013.01); *A61H 2201/5071* (2013.01); *A61H 2201/5079* (2013.01); *A61H 2201/5082* (2013.01); *A61H 2201/5084* (2013.01); *A61H 2201/5097* (2013.01); *A61H 2203/0406* (2013.01); *A61H 2205/06* (2013.01); *A61H 2205/065* (2013.01); *A61H 2230/06* (2013.01); *A61H 2230/25* (2013.01); *A61H 2230/50* (2013.01); *A63B 21/0058* (2013.01); *A63B 21/4035* (2015.10); *A63B 22/0012* (2013.01); *A63B 22/20* (2013.01); *A63B 23/0405* (2013.01); *A63B 2022/0094* (2013.01); *B62B 5/004* (2013.01); *B62B 5/0069* (2013.01); *B62B 5/0404* (2013.01)

(58) Field of Classification Search
CPC .... A61H 2201/0173; A61H 2201/0176; A61H 2201/1207; A61H 2201/1215; A61H 2201/1261; A61H 2201/14; A61H 2201/1635; A61H 2201/1664; A61H 2201/1669; A61H 2201/1676; A61H 2201/5007; A61H 2201/5061; A61H 2201/5064; A61H 2201/5069; A61H 2201/5071; A61H 2201/5079; A61H 2201/5082; A61H 2201/5084; A61H 2201/5097; A61H 2203/0406; A61H 2205/06; A61H 2205/065; A61H 2230/06; A61H 2230/25; A61H 2230/50; A63B 21/4045; A63B 21/4047; A63B 23/03516; A63B 23/03533; A63B 23/03575; A63B 23/04; A63B 23/12; A63B 23/1209; A63B 21/0058; A63B 21/4035; A63B 22/0012; A63B 22/20; A63B 23/0405; A63B 2022/0094; B62B 3/00; B62B 5/06; B62B 5/004; B62B 5/0069; B62B 5/0404; B62B 5/0043; B62B 5/0073

See application file for complete search history.

(56) References Cited

U.S. PATENT DOCUMENTS

| | | | | |
|---|---|---|---|---|
| 7,708,120 | B2* | 5/2010 | Einbinder | F16C 1/10 188/2 A |
| 7,900,940 | B1* | 3/2011 | Vidmar | A61H 3/008 280/271 |
| 8,007,409 | B2* | 8/2011 | Ellis | A63B 21/0616 482/54 |
| 8,627,909 | B2* | 1/2014 | Chang | A61H 3/04 180/19.2 |
| 9,770,377 | B2* | 9/2017 | Isozumi | A61G 5/14 |
| 10,765,586 | B2* | 9/2020 | Liang | A61H 1/00 |
| 10,874,562 | B2* | 12/2020 | Liang | A61G 5/1059 |
| 2007/0194547 | A1* | 8/2007 | Steiner | A61H 3/04 280/87.021 |
| 2008/0129016 | A1* | 6/2008 | Willis | A61G 5/08 280/639 |
| 2009/0045021 | A1* | 2/2009 | Einbinder | B60T 17/22 74/502.2 |
| 2009/0298653 | A1* | 12/2009 | Rodetsky | A61H 3/04 280/200 |
| 2010/0083994 | A1* | 4/2010 | Liu | A61G 5/02 135/67 |
| 2012/0000496 | A1* | 1/2012 | Razon | A61H 3/04 135/85 |
| 2012/0187661 | A1* | 7/2012 | Kim | A61H 3/04 280/47.38 |
| 2015/0053042 | A1 | 2/2015 | Shirakawa et al. | |
| 2017/0001656 | A1 | 1/2017 | Katayama et al. | |
| 2017/0326019 | A1* | 11/2017 | Bramsiepe | B62B 5/064 |
| 2019/0290513 | A1* | 9/2019 | Liang | A61G 5/1059 |
| 2019/0290958 | A1* | 9/2019 | Shahriar | A63B 23/03516 |
| 2020/0352815 | A1* | 11/2020 | Raja | B60B 19/003 |
| 2021/0155278 | A1* | 5/2021 | Raja | B62B 5/0036 |

FOREIGN PATENT DOCUMENTS

| | | | | |
|---|---|---|---|---|
| EP | 3205322 | * | 8/2017 | ............ A61H 3/04 |
| JP | 2009-106446 | | 5/2009 | |
| JP | 5706016 | B2 | 4/2015 | |
| JP | 2017-12546 | | 1/2017 | |
| KR | 10-0717397 | B1 | 5/2007 | |
| WO | WO 2016/136370 | A1 | 9/2016 | |
| WO | 2017/079491 | A1 | 5/2017 | |

\* cited by examiner

FIG. 9

| CONDITION | MANUAL MODE SWITCHING UNIT 76a | STATE OF MOVABLE HANDLES (20R AND 20L) | | STATE OF FIXED HANDLES (20FR AND 20FL) |
|---|---|---|---|---|
| | | MOVABLE HANDLE GRASPING STATE (1 = GRASPED, 0 = NOT GRASPED) | ARM SWING STATE (1 = WITH ARM SWING, 0 = WITHOUT ARM SWING) | FIXED HANDLE GRASPING STATE (1 = GRASPED, 0 = NOT GRASPED) |
| C1 | ASSIST MODE | 0 | 0 | 1 |
| C2 | ASSIST MODE | 1 | 0 | 0 |
| C3 | TRAINING MODE 1 | 1 | 1 | 0 |
| C4 | TRAINING MODE 2 | 1 | 1 | 0 |
| C5 | TRAINING MODES 3 AND 4 | 1 | 0 | 0 |
| C6 | TRAINING MODES 3 AND 4 | 0 | 0 | 1 |

| CONDITION | CURRENT OPERATION MODE | STATE OF MOVABLE HANDLES (20R AND 20L) | | STATE OF FIXED HANDLES (20FR AND 20FL) |
|---|---|---|---|---|
| | | MOVABLE HANDLE GRASPING STATE (1 = GRASPED, 0 = NOT GRASPED) | ARM SWING STATE (1 = WITH ARM SWING, 0 = WITHOUT ARM SWING) | FIXED HANDLE GRASPING STATE (1 = GRASPED, 0 = NOT GRASPED) |
| CR1 | ASSIST MODE 1 (AM1) | — | — | 0 |
| CR2 | ASSIST MODE 2 (AM2) | 0 | — | — |
| CR3 | TRAINING MODE 1 (TR1) | 0 | — | — |
| CR4 | TRAINING MODE 2 (TR2) | 0 | — | — |
| CR5 | TRAINING MODE 3 (TR3) | 0 | — | — |
| CR6 | TRAINING MODE 4 (TR4) | — | — | 0 |

FIG. 11
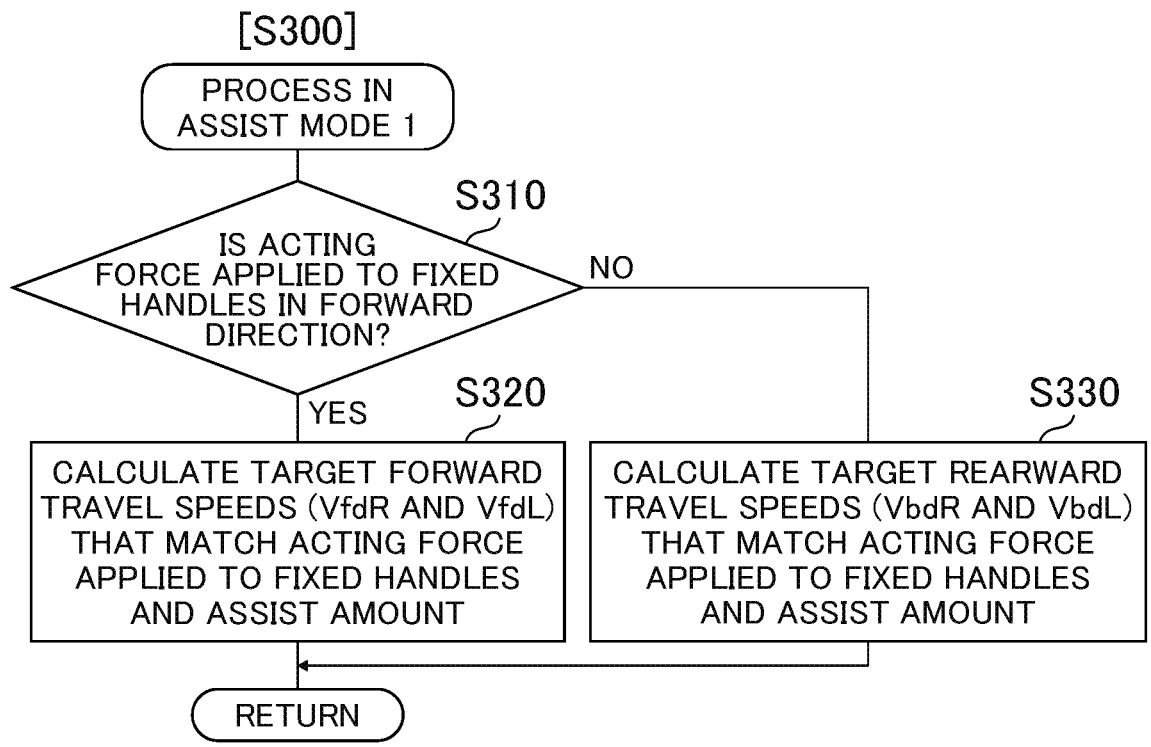
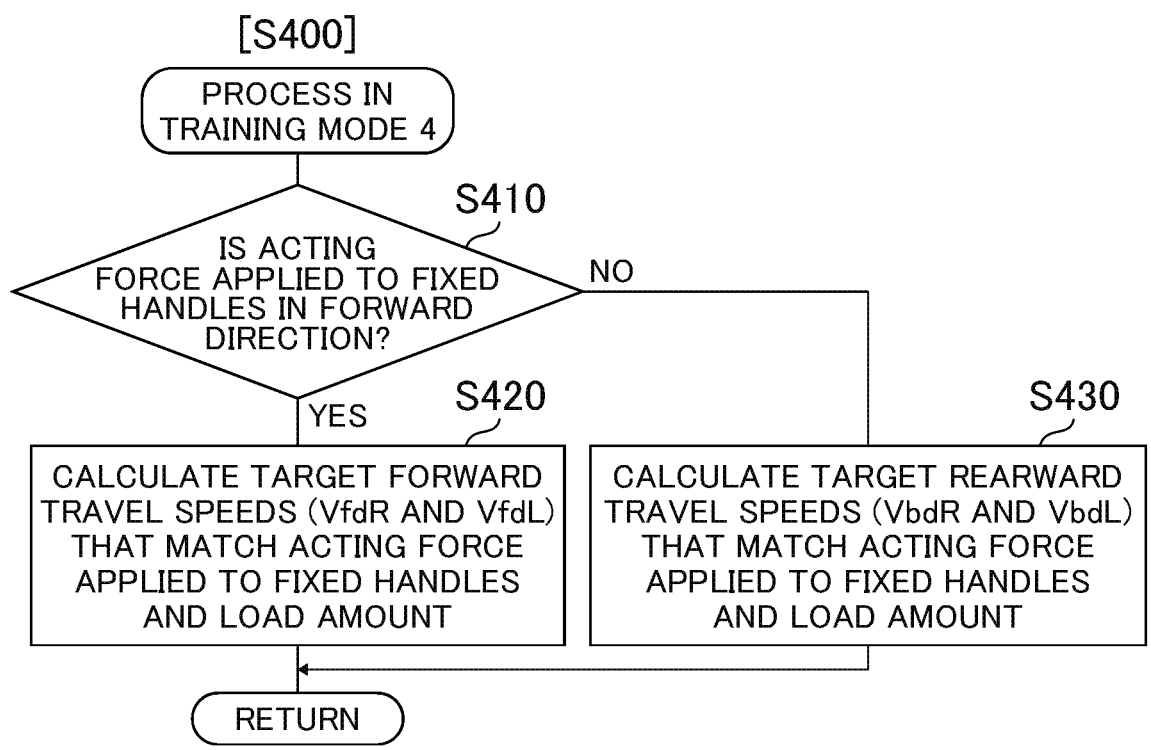

FIG. 15B

[S1300] DETERMINATION OF DEVIATION BETWEEN TRAVEL SPEED OF WALKING ASSIST DEVICE AND WALKING SPEED OF USER

S1320: IS $|Vhfd + Vhbd|$ LESS THAN $\Delta Verr$ AND ARE MOVABLE HANDLES AT POSITIONS OTHER THAN VICINITY OF FRONT END OR VICINITY OF REAR END OF MOVABLE RANGE OF RAILS?

- YES → S1330: TRAVEL SPEED OF WALKING ASSIST DEVICE ← SAME AS WALKING SPEED OF USER
- NO → S1340: IS $|Vhfd|$ OR $|Vhbd|$ MORE THAN MOVABLE HANDLES IN VICINITY OF FRONT END OF MOVABLE RANGE OF RAILS?
  - YES → S1350: TRAVEL SPEED OF WALKING ASSIST DEVICE ← LOWER THAN WALKING SPEED OF USER
  - NO → S1360: TRAVEL SPEED OF WALKING ASSIST DEVICE ← HIGHER THAN WALKING SPEED OF USER

RETURN

FIG. 16

| MODE TRANSITION CONDITION (1 = WITHOUT ABNORMALITY, 0 = WITH ABNORMALITY) | BODY STATE | | ATMOSPHERIC STATE | VEHICLE BODY STATE | | | |
|---|---|---|---|---|---|---|---|
| | HEART RATE (NORMAL = 1, ABNORMAL = 0) | BODY TEMPERATURE (NORMAL = 1, ABNORMAL = 0) | OUTSIDE TEMPERATURE (COMFORTABLE = 1, UNCOMFORTABLE = 0) | INCLINATION OF VEHICLE BODY (NO = 1, YES = 0) | IMPACT ON VEHICLE BODY (NO = 1, YES = 0) | WALKING DISTANCE (SHORT = 1, LONG = 0) | WALKING TIME (SHORT = 1, LONG = 0) |
| 1 | 1 | 1 | 1 | 1 | 1 | 1 | 1 |
| 0 | 0 | – | – | – | – | – | – |
| 0 | – | 0 | – | – | – | – | – |
| 0 | – | – | 0 | – | – | – | – |
| 0 | – | – | – | 0 | – | – | – |
| 0 | – | – | – | – | 0 | – | – |
| 0 | – | – | – | – | – | 0 | – |
| 0 | – | – | – | – | – | – | 0 |

FIG. 17

| CONDI-TION | STATE OF MANUAL MODE SWITCHING UNIT 76a | STATE OF MOVABLE HANDLES (20R AND 20L) | | FIXED HANDLES (20FR AND 20FL) | MODE TRANSITION CONDITION (1 = WITHOUT ABNORMAL-ITY, 0 = WITH ABNORMALITY) |
|---|---|---|---|---|---|
| | | MOVABLE HANDLE GRASPING STATE (1 = GRASPED, 0 = NOT GRASPED) | ARM SWING WITH MOVABLE HANDLES (1 = WITH ARM SWING, 0 = WITHOUT ARM SWING) | FIXED HANDLE GRASPING STATE (1 = GRASPED, 0 = NOT GRASPED) | |
| S1 | TRAINING MODE 1 | 1 | 1 | 0 | 1 |
| S2 | TRAINING MODE 1 | 1 | 1 | 0 | 0 |
| S3 | TRAINING MODES 3 AND 4 | 1 | 0 | 0 | 1 |
| S4 | TRAINING MODES 3 AND 4 | 1 | 0 | 0 | 0 |
| S5 | TRAINING MODES 3 AND 4 | 0 | 0 | 1 | 1 |
| S6 | TRAINING MODES 3 AND 4 | 0 | 0 | 1 | 0 |

WALKING ASSIST DEVICE

INCORPORATION BY REFERENCE

The disclosures of Japanese Patent Applications No. 2018-33293 and No. 2018-195693 respectively filed on Feb. 27, 2018 and Oct. 17, 2018, each including the specification, drawings and abstract, are incorporated herein by reference in their entireties.

BACKGROUND OF THE INVENTION

1. Field of the Invention

The present invention relates to a walking assist device.

2. Description of Related Art

In order for a user that can walk on his/her own to walk with better quality, it is very important to swing his/her arms correctly in synchronization with his/her legs in a correct posture with his/her body trunk straight without leaning on a walker.

Japanese Patent Application Publication No. 2017-12546 (JP 2017-12546 A), for example, describes a hand cart (corresponding to the walking assist device) that generates an assist force for assisting movement of the hand cart in a travel direction in accordance with the magnitude and the direction of a handle force which is a force with which a user pushes the hand cart while grasping handlebars (corresponding to the fixed handles). The hand cart has a rotational angle sensor and an inclination angle sensor, and drives wheels such that the user can walk stably by pushing the hand cart on the basis of information such as the travel direction and the inclination angle of the vehicle body in various use situations.

Japanese Patent Application Publication No. 2009-106446 (JP 2009-106446 A) describes a walking cart (corresponding to the walking assist device) that includes a pair or right and left front wheels, rear wheels, main frames, side frames, sliders, handles, and connecting rods. The sliders, to which the handles are fixed, are slidable back and forth along the side frames. The sliders are connected to the rear wheels via the connecting rods. Consequently, when a user causes the vehicle body to travel forward by grasping the right and left handles with his/her right and left hands and pushing the walking cart forward, the right and left handles are moved back and forth alternately by rotational motion of the rear wheels. That is, the walking cart moves together with the user who walks while swinging his/her arms, and the power source of the walking cart is the force of the user to swing his/her arms back and forth.

In order to assist the user in performing high-quality walk in which the user swings his/her arms correctly in synchronization with motion of the legs of the user, the walking speed of the user at which the user walks at his/her own pace while swinging his/her arms and the travel speed at which the walking assist device travels must be caused to coincide with each other.

The hand cart described in JP 2017-12546 A cannot assist the user in performing high-quality walk in which the user swings his/her arms correctly in synchronization with motion of the legs of the user.

The walking cart described in JP 2009-106446 A can assist the user in walking while swinging his/her arms. However, the arm swing width with which the user swings his/her arms is fixed, and there is no drive source that drives the wheels and the wheels of the walking cart are driven (rotated) by swing of the arms of the user. Thus, the travel speed of the walking cart is determined by the arm swing speed at which the user swings his/her arms. Thus, in order to adjust the travel speed of the walking cart, the arm swing speed of the user must be adjusted. Therefore, the user must forcibly adjust the walking speed or the arm swing speed in order to cause the walking speed of the user himself/herself and the travel speed of the walking cart to coincide with each other, and thus may not be able to walk appropriately at his/her own pace.

SUMMARY OF THE INVENTION

It is an object of the present invention to provide a walking assist device that assists a user in performing high-quality walk in which the user swings his/her arms correctly in synchronization with motion of the legs of the user, and that achieves a travel speed that matches the arm swing state and the walking speed which are natural (comfortable) for the user.

An aspect of the present invention provides a walking assist device including:
a frame;
a plurality of wheels provided at a lower end of the frame and including at least one drive wheel;
a drive unit that drives the drive wheel to cause the walking assist device to travel forward or rearward;
a battery that serves as a power source for the drive unit;
a drive control unit that controls the drive unit; and
a pair of right and left movable handles that are grasped by a user and that are movable back and forth with respect to the frame in accordance with arm swing performed during walk of the user;
a handle guide unit provided on the frame to guide the movable handles in a movable range in accordance with the arm swing performed during the walk of the user; and
a grasp portion state detection unit that detects a state of the movable handles.

The drive control unit controls a travel speed of the walking assist device by controlling the drive unit on the basis of the state of the movable handles which is detected using the grasp portion state detection unit.

With the walking assist device according to the aspect described above, the drive unit is controlled on the basis of the state of the movable handles (e.g. the position of the movable handles or the speed of movement of the movable handles) which is detected using the grasp portion state detection unit. Thus, the travel speed of the walking assist device is adjusted in accordance with the arm swing state of the user. Thus, it is possible to assist the user in performing high-quality walk in which the user swings his/her arms correctly in synchronization with motion of the legs of the user, and to achieve a travel speed that matches the arm swing state and the walking speed which are natural (comfortable) for the user.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9 illustrates conditions for transitioning from a determination mode to various operation modes in FIG. 8 and conditions for returning to the determination mode;

FIG. 11 is a flowchart illustrating the procedure of processes in an assist mode 1 and a training mode 4 in the drive control unit of the walking assist device;

FIG. 15B is a flowchart illustrating the procedure of processes for determination of a turn and determination of the deviation between the travel speed of the walking assist device and the walking speed of a user in the drive control unit of the walking assist device;

FIG. 16 illustrates mode transition conditions for transitioning among the operation modes on the basis of a body state, an atmospheric state, and a vehicle body state;

FIG. 17 illustrates conditions for transitioning to the various operation modes in the case where the operation mode is automatically switched;

DETAILED DESCRIPTION OF EMBODIMENTS

Figure 1:
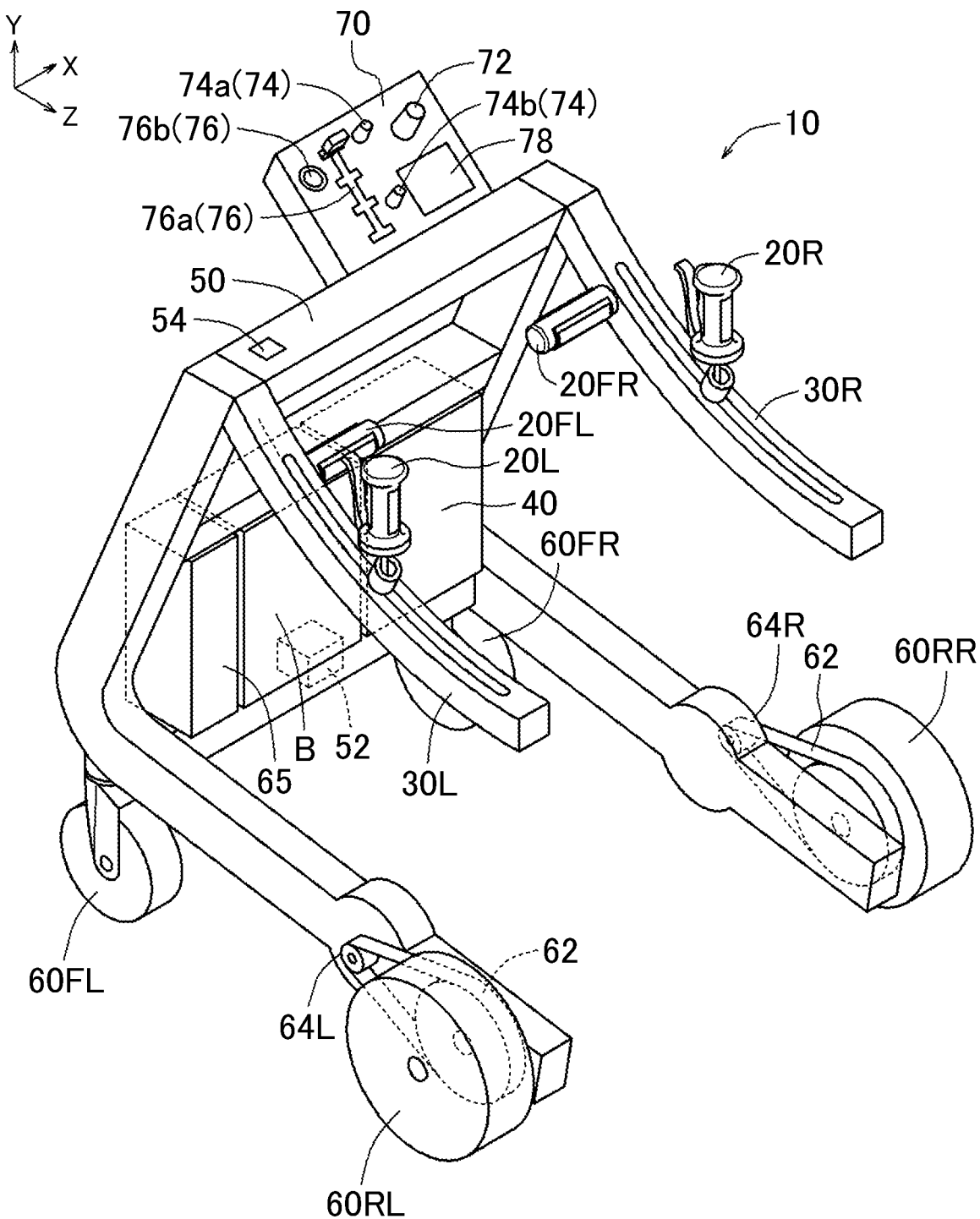
FIG. 1 is a perspective view illustrating the overall configuration of a walking assist device.

An embodiment of the present invention will be described below with reference to the drawings. The X axis, the Y axis, and the Z axis in the drawings are orthogonal to each other. In FIG. 1, the Z-axis direction indicates the direction from a front wheel 60FR to a rear wheel 60RR, and the X-axis direction indicates the direction from the left to the right in a frame 50. In the frame 50, the X-axis direction is referred to as "right", the direction opposite to the X-axis direction is referred to as "left", the direction opposite to the Z-axis direction is referred to as "front", and the Z-axis direction is referred to as "rear". In addition, the Y-axis direction is referred to as "upper", and the direction opposite to the Y-axis direction is referred to as "lower". The angular speed for rotation as seen in the X-axis direction is referred to as the pitch angular speed, the angular speed for rotation as seen in the Y-axis direction is referred to as the yaw angular speed, and the angular speed for rotation as seen in the Z-axis direction is referred to as the roll angular speed. The magnitude of the angular speed for clockwise rotation as seen in the direction of each of the X axis, the Y axis, and the Z axis is defined as "positive", and the magnitude of the angular speed for counterclockwise rotation as seen in the direction of each of the X axis, the Y axis, and the Z axis is defined as "negative".

A schematic configuration of the embodiment of the present invention will be described with reference to FIG. 1. FIG. 1 illustrates a walking assist device 10 according to the present embodiment. The walking assist device 10 has rails 30R and 30L (corresponding to the arm portion and the handle guide units), a drive control unit 40, the frame 50, front wheels 60FR and 60FL, rear wheels 60RR and 60RL, drive units 64R and 64L (e.g. electric motors), a control panel 70, a battery B, and a regenerated power collecting unit 65. The front wheels 60FR and 60FL and the rear wheels 60RR and 60RL correspond to the plurality of wheels.

As illustrated in FIG. 1, the frame 50 is shaped symmetrically in the right-left direction, and the rail 30R and the rail 30L are provided on the right side and the left side, respectively, of the frame 50 so as to extend along the front-rear direction of the frame 50. A user enters a space between the rail 30R and the rail 30L from the open side of the frame 50, and operates the walking assist device 10. The front wheels 60FR and 60FL are follower wheels (turnable caster wheels) provided at the lower front end of the frame 50.

The frame 50 is provided with an outside temperature sensor 54 that detects an outside temperature, and a three-axis acceleration/angular speed sensor 52 that detects inclination of the walking assist device 10 in each of the X-axis direction, the Y-axis direction, and the Z-axis direction. The rear wheels 60RR and 60RL are drive wheels provided at the lower rear end of the frame 50, and are driven by the drive units 64R and 64L, respectively, via belts 62. In the example illustrated in FIG. 1, a pair of right and left rear wheels are provided as the drive wheels, and are independently driven by the respective drive units. The rear wheels 60RR and 60RL can cause the walking assist device 10 to travel forward, travel rearward, make a right turn, and make a left turn.

The rail 30R has a movable handle 20R (corresponding to the grasp portion) and a fixed handle 20FR (corresponding to the grasp portion) that can be grasped by the user. The rail 30L has a movable handle 20L (corresponding to the grasp portion) and a fixed handle 20FL (corresponding to the grasp portion) that can be grasped by the user. The movable handle 20R is provided on the rail 30R, and is movable in the front-rear direction along the rail 30R in accordance with swing of an arm during walk of the user. The movable handle 20L is provided on the rail 30L, and is movable in the front-rear direction along the rail 30L in accordance with swing of an arm during walk of the user.

The rails 30R and 30L of the frame 50 are provided with the fixed handles 20FR and 20FL, respectively. The rails 30R and 30L are not limited to being shaped to be concavely curved upward, and may have a straight shape.

As illustrated in FIG. 1, the control panel 70 is provided at a position at which the control panel 70 is easily operable by the user at the upper portion of the frame 50, for example. The control panel 70 has a main switch 72, an assist amount adjustment volume 74a, a load amount adjustment volume 74b, a manual mode switching unit 76a, an automatic mode switching unit switch 76b, and a monitor 78 (corresponding to the display unit).

The walking assist device 10 has a training mode, in which a load is applied to operation of the body of the user performed as the user walks, and an assist mode, in which the load on operation of the body of the user performed as the user walks is alleviated, as operation modes. The operation mode switching unit 76 has the manual mode switching unit 76a, the automatic mode switching unit switch 76b, and an automatic mode switching unit 76AT (see FIG. 7). The manual mode switching unit 76a switches the operation mode of the walking assist device 10 through a manual operation by the user. The manual mode switching unit 76a allows selection of one of four operation modes including an "assist mode", a "training mode 1", a "training mode 2", and "training modes 3 and 4" (see FIG. 9).

The automatic mode switching unit switch 76b is a switch that permits the drive control unit 40 to automatically switch the operation mode. In the case where the automatic mode switching unit switch 76b is on, the automatic mode switching unit 76AT of the drive control unit 40 automatically switches the operation mode on the basis of information selected through the manual mode switching unit 76a and conditions in FIGS. 16 and 17.

The assist amount adjustment volume 74a is used to adjust the magnitude (assist amount) of an assist force in the assist mode. The load amount adjustment volume 74b is used to adjust the magnitude (load amount) of a load in the training mode.

The monitor 78 is a monitor that displays operation mode information, and displays the charge amount of the battery B, a walking history, information on the body state of the user, a body information history of the user, a surrounding atmospheric state, a load amount/assist amount, an operation history of the walking assist device 10, a vehicle body state, etc., for example, besides the operation mode information.

Figure 2:
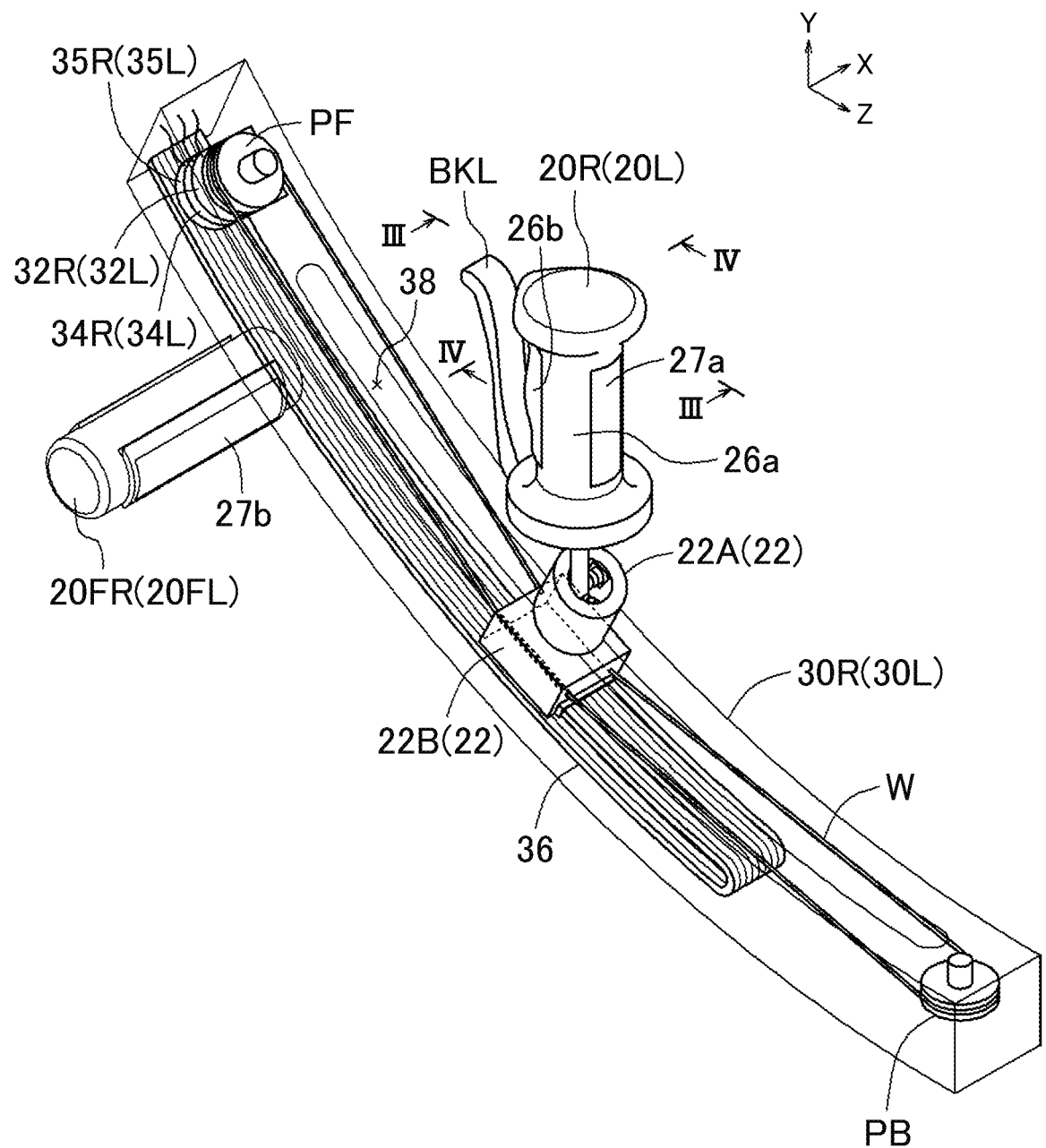
FIG. 2 is a perspective view illustrating the configuration and the function of a movable handle, a fixed handle, and a rail.
Figure 3:
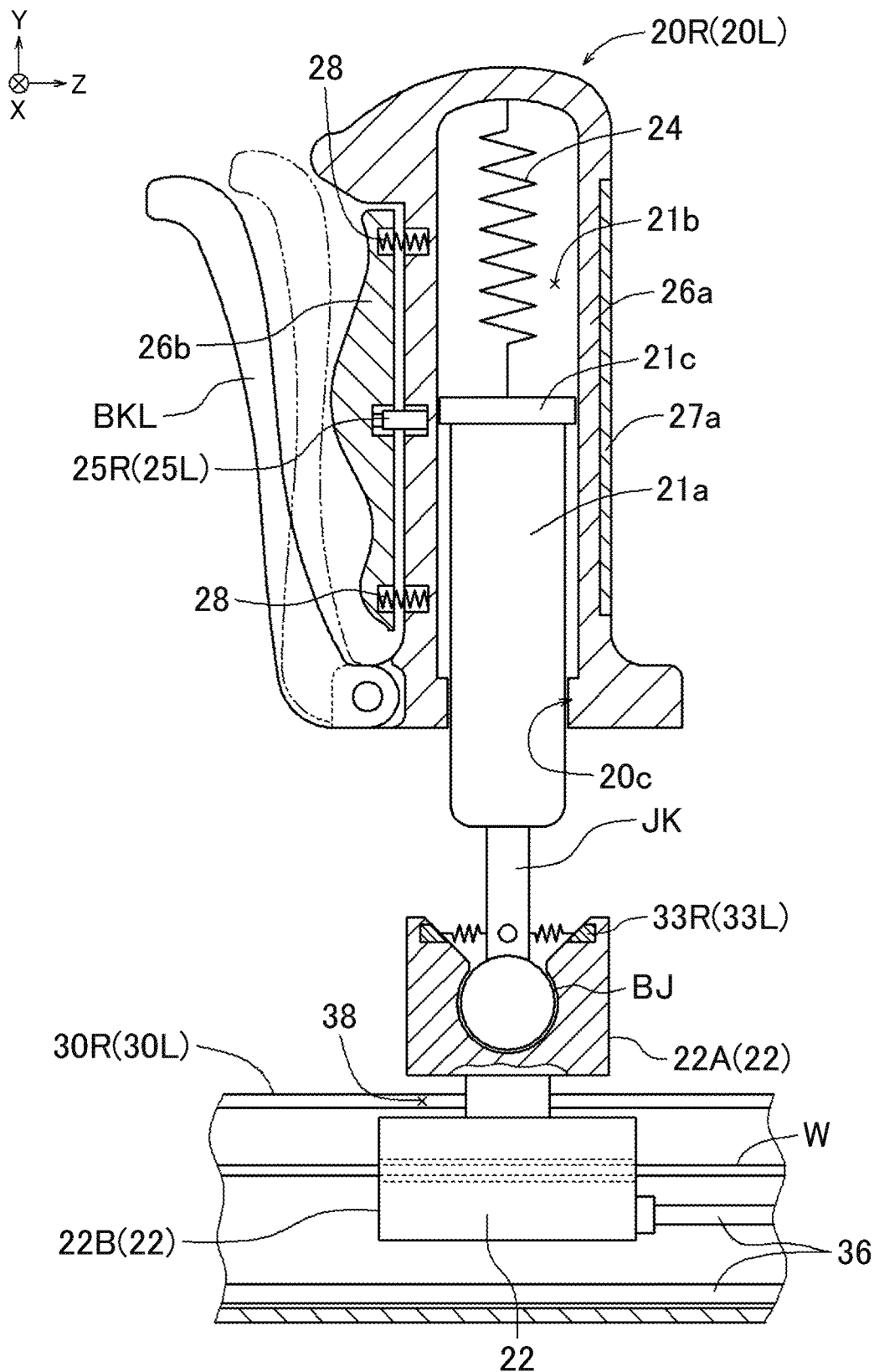
FIG. 3 is a sectional view of the movable handle as seen in the direction in FIG. 2.
Figure 4:
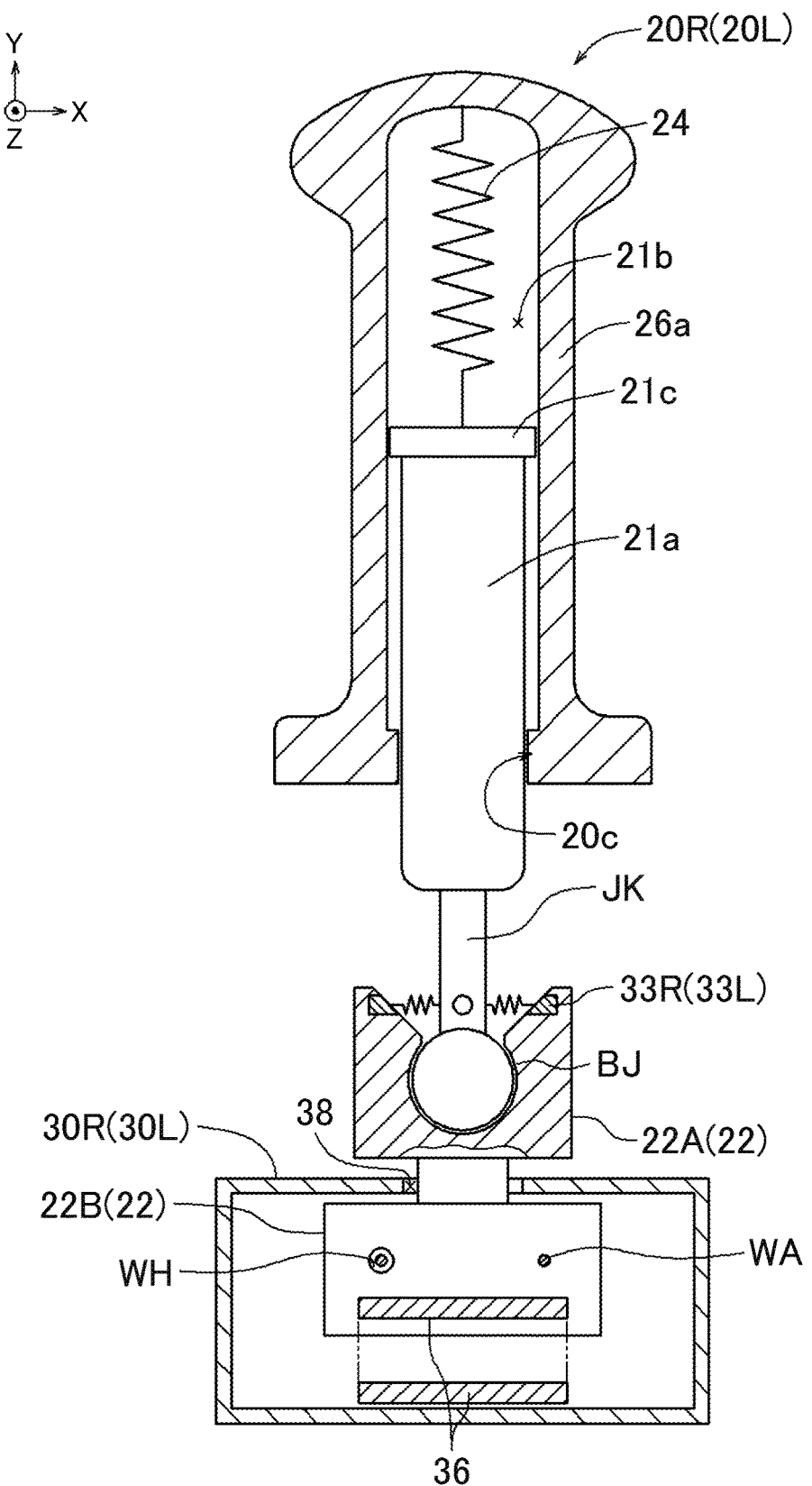
FIG. 4 is a sectional view of the movable handle as seen in the IV-IV direction in FIG. 2.
Figure 5:
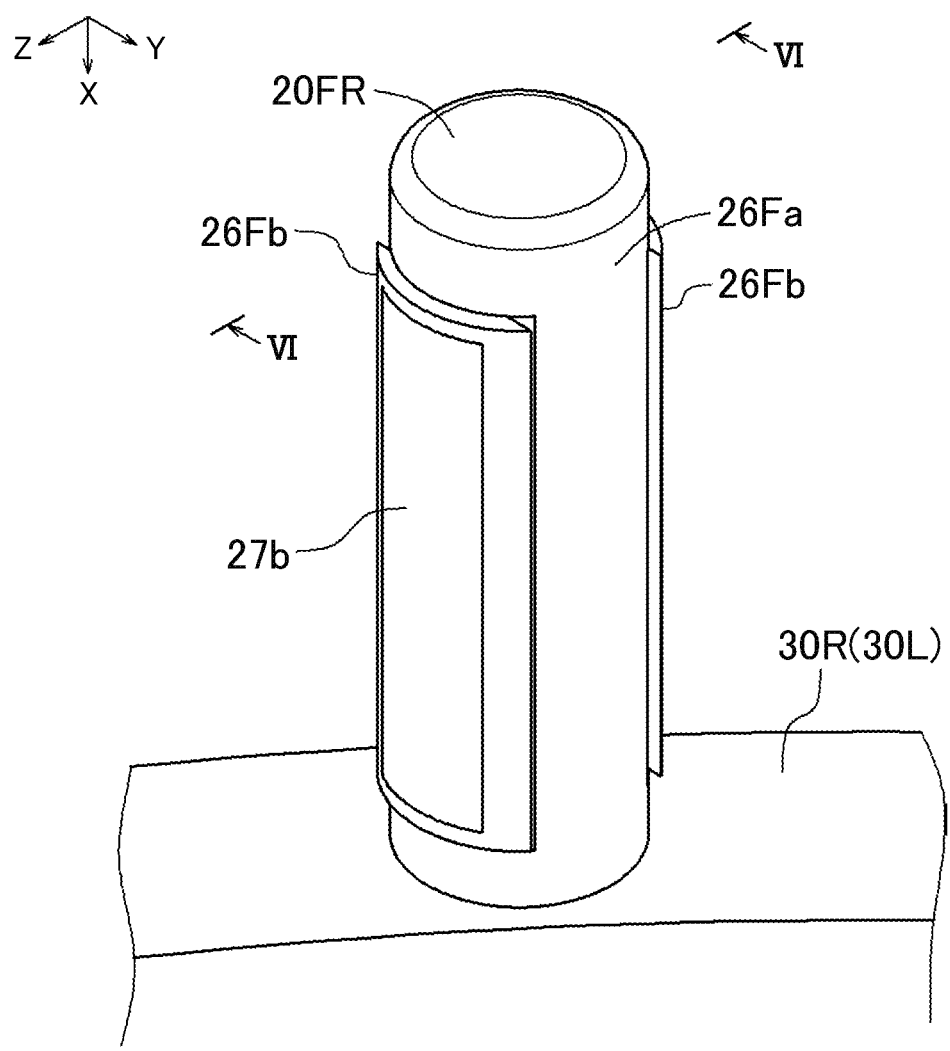
FIG. 5 is an enlarged perspective view of the fixed handle in FIG. 2.
Figure 6:
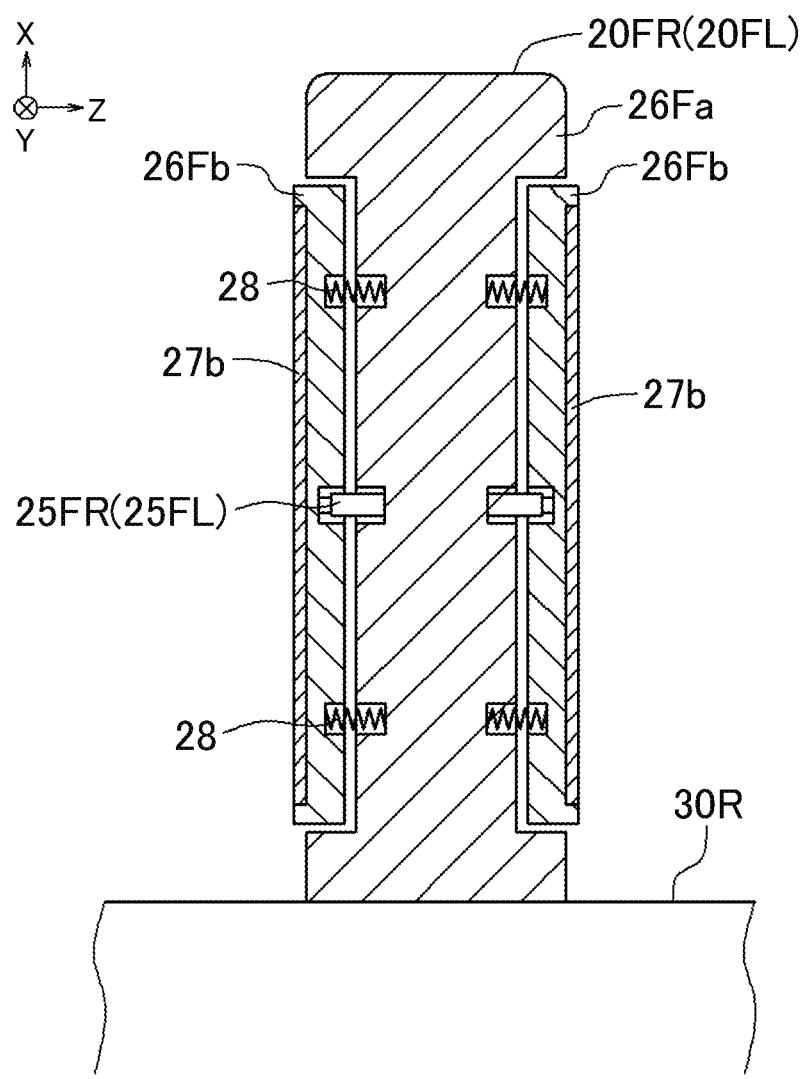
FIG. 6 is a sectional view of the fixed handle as seen in the VI-VI direction in FIG. 5.

The structure of the walking assist device 10 will be described in detail with reference to FIGS. 2 to 6. The walking assist device 10 has a symmetrical structure between the right and the left of the frame 50 except for the control panel 70, the drive control unit 40, the battery B, and the regenerated power collecting unit 65. Therefore, the structure on the right side will be mainly described, and description of the structure on the left side will be omitted. FIG. 2 is a perspective view illustrating the configuration and the function of the movable handle 20R, the fixed handle FR, and the rail 30R. FIG. 3 is a sectional view of the movable handle 20R as seen in the direction in FIG. 2. FIG. 4 is a sectional view of the movable handle 20R as seen in the IV-IV direction in FIG. 2. FIG. 5 is an enlarged perspective view of the fixed handle 20FR in FIG. 2. FIG. 6 is a sectional view of the fixed handle 20FR as seen in the VI-VI direction in FIG. 5.

As illustrated in FIG. 2, the rail 30R has the movable handle 20R, pulleys PB and PF, and a wire W. The rail 30R is shaped to be concavely curved upward, and has a rail slit portion 38 that opens upward, extends along the front-rear direction, and defines the movable range of the movable handle 20R. The rail 30R is provided with the pulleys PB and PF at both ends in the front-rear direction. The wire W is wound around the pulley PF, which is provided on the front side, and the pulley PB, which is provided on the rear side, so that the pulleys PF and PB are rotated in conjunction with each other. A motor 32R, a right handle position detection unit 34R (e.g. an encoder), and a handle movement limiting unit 35R are provided coaxially with the pulley PF. As illustrated in FIG. 4, the wire W is fixed to a wire connection portion WA of an anchor portion 22B, and the wire W is inserted through a wire hole WH without being fixed. The movable handle 20R is connected to the anchor portion 22B. Consequently, the motor 32R can assist movement of the movable handle 20R, or apply a load to movement of the movable handle 20R, by rotating the pulley PF to rotate the wire W between the pulleys. The right handle position detection unit 34R outputs the amount of rotation of the pulley PF which accompanies movement of the movable handle 20R on the rail 30R to the drive control unit 40.

As illustrated in FIG. 3, the movable handle 20R has a handle shaft portion 21a, a shaft portion fitting hole 21b, a slider 22, a grip portion 26a, a switch grip portion 26b, and a brake lever BKL. The slider 22 is composed of a handle holding portion 22A and the anchor portion 22B.

As illustrated in FIG. 3, one end of an urging unit 24 is connected to the handle shaft portion 21a, and the other end thereof is connected to the bottom portion of the shaft portion fitting hole 21b. A flange portion 21c that extends in the circumferential direction is provided at the end portion of the handle shaft portion 21a to which the urging unit 24 is connected. An inner flange portion 20c is provided on an inside wall surface at an opening of the shaft portion fitting hole 21b. Consequently, the grip portion 26a is slidable up and down along the longitudinal direction of the handle shaft portion 21a without separating from the handle shaft portion 21a. That is, the movable handle 20R has an expansion/contraction mechanism that enables expansion and contraction in the projecting direction.

A handle support shaft JK is provided on the side of the handle shaft portion 21a to which the urging unit 24 is not connected. The distal end of the handle support shaft JK is formed in a generally spherical shape, and forms a ball joint together with a recess provided in the handle holding portion 22A. Consequently, the movable handle 20R can be tilted to the front, rear, right, and left within a range defined by an opening with respect to the handle holding portion 22A (see FIGS. 3 and 4). A right handle tilt detection unit 33R that detects the amount of this tilt is provided at the opening of the handle holding portion 22A, and disposed on the front, rear, right, and left with respect to the handle support shaft JK. The right handle tilt detection unit 33R may be a pressure sensor that detects a pressure in accordance with expansion and contraction of springs provided between the side surfaces of the handle support shaft JK and the opening of the handle holding portion 22A, for example.

As illustrated in FIG. 3, the switch grip portion 26b is provided such that a predetermined gap is formed between the grip portion 26a and the switch grip portion 26b by grip urging units 28 (e.g. springs). A grasp detection unit 25R is turned on when a pressure is applied with the switch grip portion 26b moved toward the grip portion 26a when the user grasps the movable handle 20R, and turned off when a pressure is not applied. The grasp detection unit 25R may be a pressure switch or a push switch, for example.

As illustrated in FIG. 3, a heart rate/body temperature sensor 27a is provided at a part of the grip portion 26a. The heart rate/body temperature sensor 27a measures the heart rate and the body temperature of the user in predetermined cycles in the case where the user grasps the movable handle 20R (20L). The heart rate of the user may be measured by measuring the blood flow at a portion grasped by his/her hand using infrared radiation, for example. The body temperature of the user may be measured by measuring variations in the resistance of a thermistor which is varied in accordance with temperature variations, or variations in infrared radiation emitted by the portion which is grasped by the user, for example.

One end of the brake lever BKL is connected to the lower front side of the grip portion 26a. A mechanism that locks rotation of the front wheels 60FR and 60FL and the rear wheels 60RR and 60RL when the brake lever BKL is grasped and pulled toward the grip portion 26a by the user, that maintains the locked state, and unlocks such rotation when the brake lever BKL is further pulled is provided (not illustrated).

As illustrated in FIG. 2, the rail 30R is provided with the handle movement limiting unit 35R which permits and prohibits movement of the movable handle 20R with respect to the frame 50. The handle movement limiting unit 35R has a lock mechanism that locks rotation of the motor 32R, for example. The handle movement limiting unit 35R prohibits movement of the handle by locking rotation of the motor 32R, and permits movement of the handle with respect to the rail (i.e. with respect to the frame) by unlocking rotation of the motor 32R.

As illustrated in FIGS. 2 and 4, one end of the wire W is inserted through the wire hole WH which is provided in the anchor portion 22B, and the other end of the wire W is connected (fixed) to the wire connection portion WA. The movable handle 20R is movable on the rail 30R with a constricted portion that connects between the handle holding portion 22A and the anchor portion 22B sliding in the rail slit portion 38.

A signal cable 36 transfers detection signals from the grasp detection unit 25R and the right handle tilt detection unit 33R to the drive control unit 40 with one end of the signal cable 36 connected to the anchor portion 22B and with the other end thereof connected to the drive control unit 40. The signal cable 36 may be a cable that is flexible such as a flexible cable, for example. The drive control unit 40 can detect the position of the movable handle 20R on the rail 30R on the basis of a detection signal from the right handle position detection unit 34R. The drive control unit 40 can detect the tilt amount of the movable handle 20R toward any of the front, rear, right, and left directions on the basis of the detection signal from the right handle tilt detection unit 33R. The drive control unit 40 can detect whether or not the movable handle 20R is grasped by the user on the basis of the detection signal from the grasp detection unit 25R.

As illustrated in FIG. 5, the fixed handle 20FR (20FL) has a grip portion 26Fa and a switch grip portion 26Fb. A heart rate/body temperature sensor 27b measures the heart rate and the body temperature of the user in predetermined cycles in the case where the user grasps the fixed handle 20FR (20FL). Measurement of the heart rate and the body temperature of the user by the heart rate/body temperature sensor 27b is the same as that by the heart rate/body temperature sensor 27a, and therefore is not described.

As illustrated in FIG. 6, the switch grip portion 26Fb is provided such that a predetermined gap is formed between the grip portion 26Fa and the switch grip portion 26Fb by grip urging units 28 (e.g. springs). A grasp detection unit 25FR is turned on when a pressure is applied with the switch grip portion 26Fb moved toward the grip portion 26Fa to output a detection signal that is proportional to the pressure when the user grasps the fixed handle 20FR, and turned off when a pressure is not applied. The grasp detection unit 25FR may be any component that outputs a detection signal that is proportional to an applied pressure such as a pressure sensor, for example.

The function of the walking assist device 10 and the processes in the various operation modes will be described in detail with reference to FIGS. 7 to 17.

Figure 7:
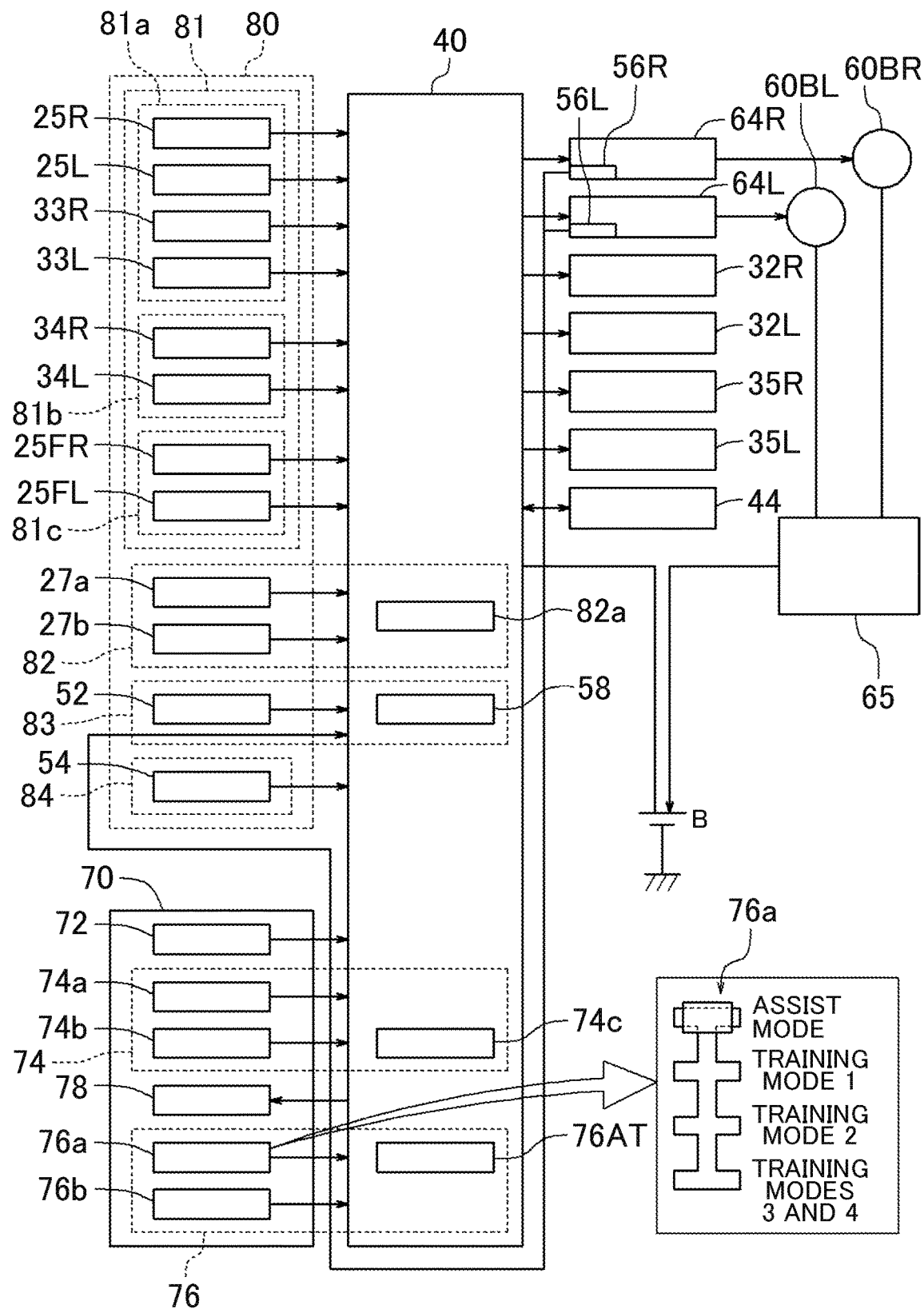
FIG. 7 is a block diagram illustrating inputs and outputs of a drive control unit of the walking assist device.

FIG. 7 is a block diagram illustrating inputs and outputs of the drive control unit 40 (e.g. a control device that includes a CPU) of the walking assist device 10 (see FIG. 1). As illustrated in FIG. 7, the drive control unit 40 controls the motors 32R and 32L, the handle movement limiting units 35R and 35L, and the drive units 64R and 64L on the basis of information input from a state detection unit 80, information stored in a storage unit 44, and information input from the control panel 70.

The drive control unit 40 drives the rear wheels 60RR and 60RL, which are drive wheels, by controlling the drive units 64R and 64L so as to achieve target travel speeds (VR and VL) which are targets for travel of the walking assist device 10. The target travel speed VR is a target travel speed at which the rear wheel 60RR of the walking assist device 10 is caused to travel on the basis of operation by the user, and the target travel speed VL is a target travel speed at which the rear wheel 60RL of the walking assist device 10 is caused to travel on the basis of operation by the user (see FIG. 1).

As illustrated in FIG. 7, the state detection unit 80 is composed of a grasp portion state detection unit 81, a body state detection unit 82, a vehicle body state detection unit 83, and an atmospheric state detection unit 84.

The grasp portion state detection unit 81 is composed of a movable handle acting force detection unit 81a, a movable handle movement amount detection unit 81b, and a fixed handle acting force detection unit 81c.

The movable handle acting force detection unit 81a has grasp detection units 25R and 25L, the right handle tilt detection unit 33R, and a left handle tilt detection unit 33L. The movable handle acting force detection unit 81a detects the presence or absence of a grasp on the movable handles 20R and 20L (see FIG. 1) by the user and a movable handle acting force which is a force to push forward and pull rearward the movable handles 20R and 20L which are grasped by the user, and outputs a signal that matches a detected state to the drive control unit 40.

The movable handle movement amount detection unit 81b has the right handle position detection unit 34R and a left handle position detection unit 34L. The movable handle movement amount detection unit 81b detects the amount of movement, in a predetermined time, of the movable handles 20R and 20L with respect to the rails 30R and 30L (see FIG. 1) made as the user walks while grasping the movable handles 20R and 20L and swinging his/her arms, and outputs a signal that matches the detected amount to the drive control unit 40.

The movable handle movement amount detection unit 81b detects movement widths DR and DL (corresponding to the arm swing width) by which the movable handles 20R and 20L are moved in the front-rear direction with respect to the rails 30R and 30L as the user walks while grasping the movable handles 20R and 20L and swinging his/her arms, and outputs a signal that matches a detected state to the drive control unit 40.

The fixed handle acting force detection unit 81c has grasp detection units 25FR and 25FL. The fixed handle acting force detection unit 81c detects the presence or absence of a grasp on the fixed handles 20FR and 20FL by the user and a fixed handle acting force which is a force to push forward and pull rearward the fixed handles 20FR (20FL) (see FIG. 1) which are grasped by the user, and outputs a signal that matches a detected state to the drive control unit 40.

The body state detection unit 82 is a device that detects the body state of the user, and has the heart rate/body temperature sensors 27a and 27b and a body information history 82a. The body state detection unit 82 detects the body state of the user, e.g. the heart rate and the body temperature of the user, through the heart rate/body temperature sensors 27a and 27b, and outputs a signal that matches a detected state to the drive control unit 40.

The body state detection unit 82 stores a history of body information (e.g. the heart rate, the body temperature, and the number of footsteps) on the user in the body information history 82a. The number of footsteps is calculated on the basis of information from the movable handle movement amount detection unit 81b on the assumption that the user makes two steps when he/she swings his/her arms back and forth once in the front-rear direction, for example.

The vehicle body state detection unit 83 is a device that detects the state of the walking assist device 10 including an operation history of the walking assist device 10, and has a travel speed acquisition unit 56R, a travel speed acquisition unit 56L, the three-axis acceleration/angular speed sensor 52, and operation history information 58.

The travel speed acquisition unit 56R and the travel speed acquisition unit 56L are connected to the drive units 64R and 64L, respectively, and output a detection signal corresponding to travel speeds (VdR and VdL) at which the rear wheels 60RR and 60RL (see FIG. 1) travel forward and rearward, respectively, to the drive control unit 40.

The three-axis acceleration/angular speed sensor 52 measures an acceleration for each of the axes in the three directions, namely the X axis, the Y axis, and the Z axis, and measures an angular speed of rotation about each of the axes in the three directions. In the case where the walking assist device 10 is traveling on an inclined surface, for example, the three-axis acceleration/angular speed sensor 52 outputs a detection signal that matches the tilt of the vehicle with respect to the inclined surface for each of the X axis, the Y axis, and the Z axis to the drive control unit 40. The three-axis acceleration/angular speed sensor 52 also detects variations in the acceleration applied to the vehicle body of the walking assist device 10 (impact on the vehicle body), and outputs a signal that matches the detected variations in the acceleration to the drive control unit 40. The three-axis acceleration/angular speed sensor 52 also detects the pitch angular speed, the yaw angular speed, and the roll angular speed of the vehicle body of the walking assist device 10, and outputs a signal that matches the detected angular speeds to the drive control unit 40.

The vehicle body state detection unit 83 stores an operation history (e.g. the walking distance and the walking time) of the walking assist device 10 in the operation history information 58, and detects the state of the walking assist device 10 (e.g. the travel speed of the walking assist device 10, the tilt of the vehicle body, and the travel speed).

The atmospheric state detection unit 84 is a device that detects the atmospheric state (e.g. the outside temperature) around the user, and has the outside temperature sensor 54. The atmospheric state detection unit 84 detects the outside temperature through the outside temperature sensor 54, and outputs a signal that matches a detected state to the drive control unit 40.

The drive control unit 40 calculates forward-direction evaluation speeds (VRhf and VLhf), which are speeds of movement in the forward direction of the movable handles 20R and 20L with respect to the frame 50, and rearward-direction evaluation speeds (VRhb and VLhb), which are speeds of movement in the rearward direction of the movable handles 20R and 20L with respect to the frame 50, on the basis of the amounts of movement of the movable handles 20R and 20L (see FIGS. 1 and 2). The magnitude of the speeds of movement of the movable handles 20R and 20L with respect to the frame 50 is defined as "positive" in the case of movement in the forward direction, and defined as "negative" in the case of movement in the rearward direction.

The forward-direction evaluation speeds (VRhf and VLhf), or the rearward-direction evaluation speeds (VRhb and VLhb), are calculated from the speeds of movement of the movable handle (20R and 20L) in a case where the user swings his/her arm forward or rearward, for example. Specifically, the evaluation speed is derived in accordance with the following procedure. The processes are the same for the right and left movable handles, and therefore only the forward-direction evaluation speed (VRhf) and the rearward-direction evaluation speed (VRhb) of the right movable handle 20R will be described.

Derivation of the forward-direction evaluation speed (VRhf) of the right movable handle 20R: The drive control unit 40 calculates the speed of movement of the movable handle 20R on the basis of the amount of movement of the movable handle 20R which is measured at predetermined intervals. The drive control unit 40 integrates (integration process) only the speeds of forward movement (speeds of movement having a "positive" magnitude) at which the movable handle 20R moves forward, among the calculated speeds of movement of the movable handle 20R. The drive control unit 40 derives the forward-direction evaluation speed (VRhf) by dividing the speed of forward movement of the movable handle 20R, which is obtained through integration, by a predetermined time (averaging process).

Derivation of the rearward-direction evaluation speed (VRhb) of the right movable handle 20R: The drive control unit 40 calculates the speed of movement of the movable handle 20R on the basis of the amount of movement of the movable handle 20R which is measured at predetermined intervals. The drive control unit 40 integrates (integration process) only the speeds of rearward movement (speeds of movement having a "negative" magnitude) at which the movable handle 20R moves rearward, among the calculated speeds of movement of the movable handle 20R. The drive control unit 40 derives the rearward-direction evaluation speed (VRhb) by dividing the speed of rearward movement of the movable handle 20R, which is obtained through integration, by a predetermined time (averaging process).

A load amount/assist amount change unit 74 has the assist amount adjustment volume 74a and the load amount adjustment volume 74b. The assist amount adjustment volume 74a outputs a detection signal that matches the adjustment amount (assist adjustment amount) for the magnitude (assist amount) of an assist force in the assist mode to the drive control unit 40. The load amount adjustment volume 74b outputs a detection signal that matches the adjustment amount (load adjustment amount) for the magnitude (load amount) of a load in the training mode to the drive control unit 40. In the assist mode, the load amount/assist amount change unit 74 changes the assist amount on the basis of information from the state detection unit 80 and the assist adjustment amount. In the training mode, the load amount/assist amount change unit 74 changes the load amount on the basis of information from the state detection unit 80 and the load adjustment amount.

The load amount/assist amount change unit 74 has a learning unit 74c, and adjusts the load amount in the training mode, and adjusts the assist amount in the assist mode, on the basis of the atmospheric state around the user which is detected using the atmospheric state detection unit 84, the operation history of the walking assist device 10 which is detected using the vehicle body state detection unit 83, and the body state of the user which is detected using the body state detection unit 82. A learning unit in the learning unit 74c determines an appropriate load amount and an appropriate assist amount on the basis of the past history of use (walking time, walking distance, load amount, and assist amount) by the user and the past body information history (heart rate, body temperature, and number of footsteps) on the user which are stored in the storage unit 44, for example. Consequently, an excessive load is not applied to the user, or the user is not assisted excessively, which makes it possible to suppress a decrease in (maintain) the physical strength of the user more appropriately.

The storage unit 44 is a device that stores information, and stores and reads information in response to a request from the drive control unit 40. The storage unit 44 stores information such as information acquired by the state detection unit 80, the result of computation performed by the drive control unit 40, the operation history of the walking assist device 10, the assist amount in the assist mode in the past during walk of the user, and the load amount in the training mode.

The control panel 70 provides switches and the monitor 78 which are necessary for the user to operate the walking assist device 10. The user makes the walking assist device 10 ready for travel by turning on the main switch 72. The user can adjust the load amount in the training mode and the assist amount in the assist mode using the assist amount adjustment volume 74a and the load amount adjustment volume 74b. The user can select a desired operation mode ("assist mode", "training mode 1", "training mode 2", and "training modes 3 and 4") by operating the manual mode switching unit 76a. In the case where the automatic mode switching unit switch 76b is turned on, the drive control unit 40 automatically switches the operation mode between the operation mode which is selected by the user and a predetermined operation mode.

The determination of the operation mode of the walking assist device 10 (see FIG. 1) by the drive control unit 40 (see FIG. 7) and the processes based on the determined operation mode will be described in detail with reference to FIGS. 8 to 17.

Figure 8:
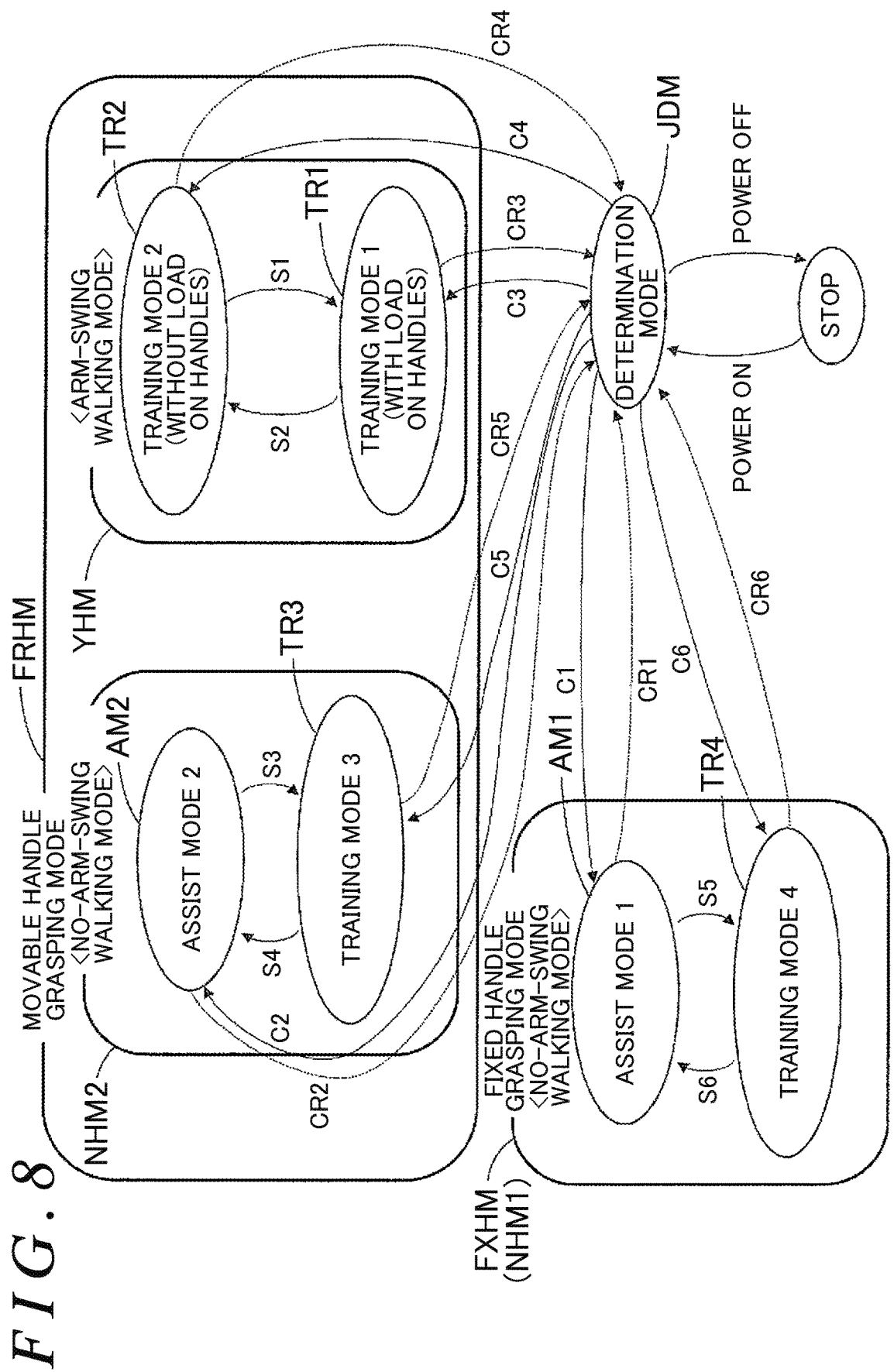
FIG. 8 illustrates operation modes of the walking assist device determined on the basis of outputs of various detection units.
Figure 10A:
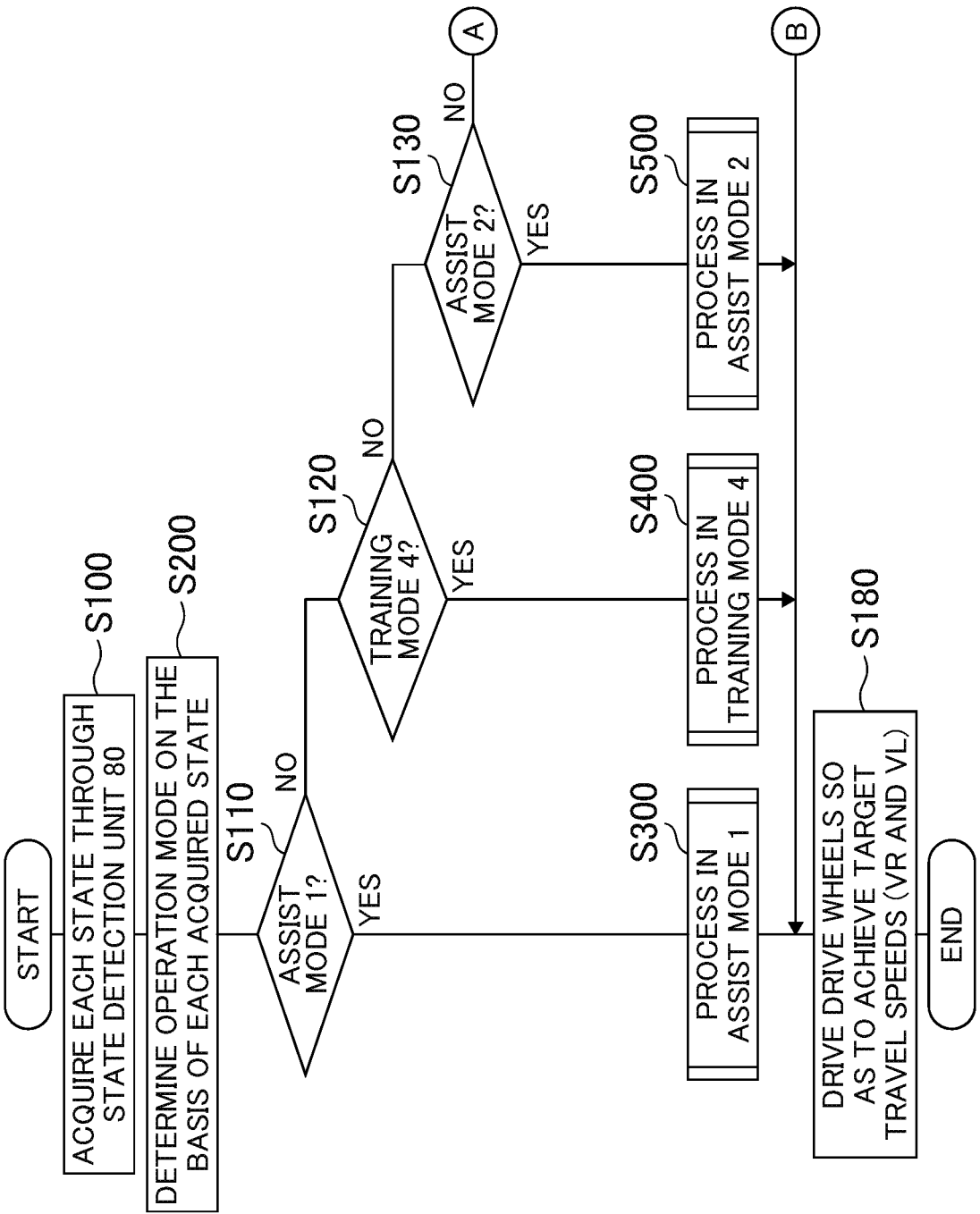
FIG. 10A is a flowchart illustrating the procedure of the overall process in the drive control unit of the walking assist device according to the first embodiment.
Figure 10B:
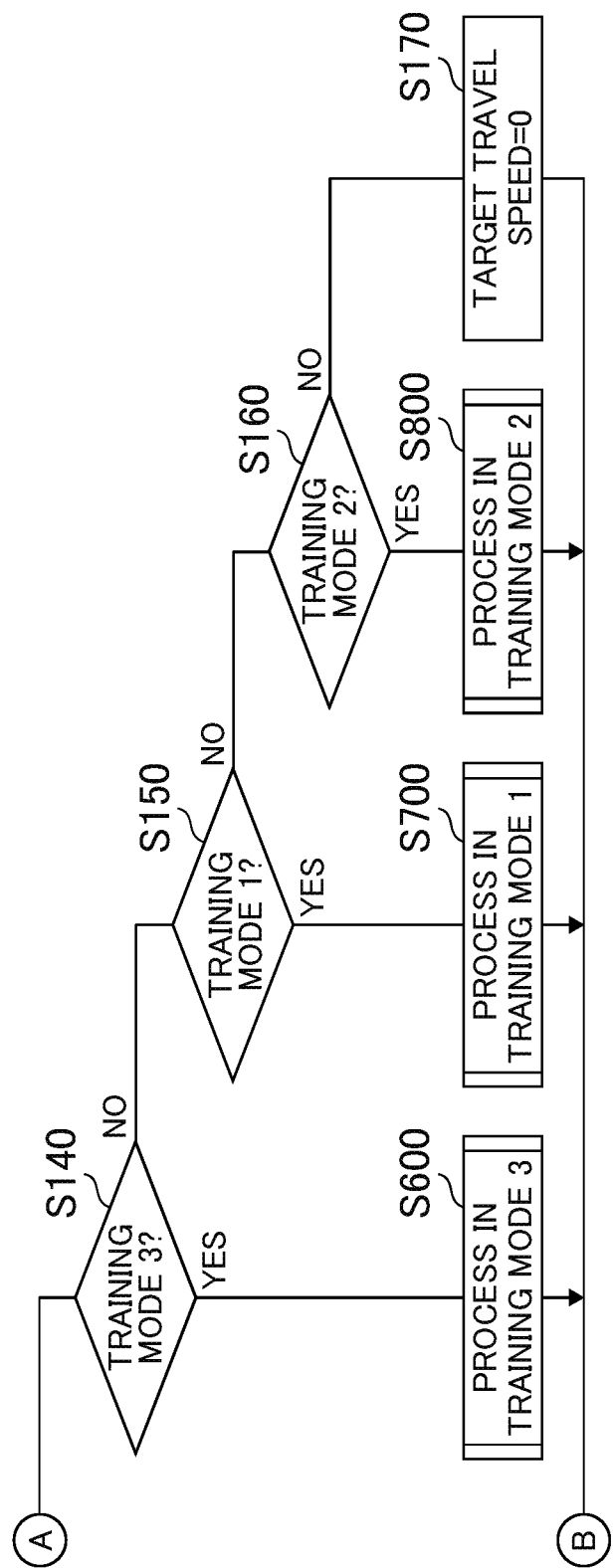
FIG. 10B is a flowchart illustrating the procedure of the overall process in the drive control unit of the walking assist device according to the first embodiment.

FIG. 8 is a state transition diagram illustrating the operation modes of the walking assist device 10 determined on the basis of outputs of the various detection units. FIG. 9 illustrates conditions for transitioning from a determination mode JDM to various operation modes in FIG. 8 and conditions for returning to the determination mode JDM. FIG. 10A and FIG. 10B are flowcharts illustrating the procedure of the overall process for the drive control unit 40 of the walking assist device 10.

FIG. 8 illustrates the operation modes of the walking assist device 10 determined on the basis of outputs of the various detection units. As illustrated in FIG. 8, the walking assist device 10 has operation modes including the determination mode JDM, an assist mode 1 (AM1), an assist mode 2 (AM2), a training mode 1 (TR1), a training mode 2 (TR2), a training mode 3 (TR3), and a training mode 4 (TR4).

When the main switch 72 (see FIG. 7) is turned on (energized), the drive control unit 40 reads the operation history which is stored in the storage unit 44, and writes the operation history into the operation history information 58. After that, the drive control unit 40 causes the walking assist device 10 to transition to the determination mode JDM. After a transition to the determination mode JDM, the drive control unit 40 acquires each state through the state detection unit 80, and causes the walking assist device 10 to transition to an operation mode based on the acquired state. When the main switch 72 is turned off (de-energized), the drive control unit 40 stores information (e.g. the walking distance and the walking time) about the operation history in the operation history information 58 in the storage unit 44, and finishes the operation.

As illustrated in FIG. 8, the operation modes include a fixed handle grasping mode FXHM and a movable handle grasping mode FRHM. In the fixed handle grasping mode FXHM, the user walks while causing the walking assist device 10 to travel by grasping the fixed handles 20FR and 20FL (see FIG. 1). In the movable handle grasping mode FRHM, the user walks while causing the walking assist device 10 to travel by grasping the movable handles 20R and 20L (see FIG. 1).

The fixed handle grasping mode FXHM, in which the user grasps the fixed handles 20FR and 20FL, is a no-arm-swing walking mode NHM1. The movable handle grasping mode FRHM includes a no-arm-swing walking mode NHM2, in which the user grasps the movable handles 20R and 20L but does not swing his/her arms, and an arm-swing walking mode YHM, in which the user swings his/her arms.

The no-arm-swing walking mode NHM2 of the movable handle grasping mode FRHM, in which the user grasps the movable handles 20R and 20L which are fixed at a predetermined position on the rails 30R and 30L (see FIG. 1), corresponds to the fixed handle grasping mode FXHM (no-arm-swing walking mode NHM1). In the arm-swing walking mode YHM, the user walks while causing the walking assist device 10 to travel by grasping the movable handles 20R and 20L and moving the movable handles 20R and 20L along the front-rear direction of the rails 30R and 30L.

The fixed handle grasping mode FXHM includes the assist mode 1 (AM1) and the training mode 4 (TR4). The no-arm-swing walking mode NHM2 of the movable handle grasping mode FRHM includes the assist mode 2 (AM2) and the training mode 3 (TR3). The arm-swing walking mode YHM of the movable handle grasping mode FRHM includes the training mode 1 (TR1) and the training mode 2 (TR2).

In the assist mode 1 (AM1) and the assist mode 2 (AM2), the load on operation of the body of the user of the walking assist device 10 can be alleviated. Specifically, the walking assist device 10 can be caused to travel with an assist force that is larger by a predetermined amount than an assist force with which operation (walk) of the body of the user performed as the user walks is equivalent to operation (walk) in a no-load state. Consequently, the load on operation (walk) of the body of the user performed as the user walks can be alleviated.

In the training mode 1 (TR1), the walking assist device 10 is caused to travel while causing the regenerated power collecting unit 65 to operate. The regenerated power collecting unit 65 is connected to the rear wheels 60RR and 60RL (see FIG. 1), and converts rotational energy into electric power to be collected (see FIGS. 1 and 7). In the training mode 1 (TR1), the walking assist device 10 can be caused to travel by applying a load to movement of the movable handles 20R and 20L in the front-rear direction through the motors 32R and 32L. Consequently, a load can be applied to operation (walk and arm swing) of the body of the user performed as the user walks.

In the training mode 2 (TR2), no load is applied to the movable handles 20R and 20L, and the walking assist device 10 can be caused to travel with an assist force with which operation (walk) of the body of the user performed as the user walks is equivalent to operation in a no-load state. Consequently, the load on operation (walk) of the body of the user performed as the user walks can be alleviated.

In the training mode 3 (TR3), the walking assist device 10 is caused to travel while causing the regenerated power collecting unit 65 to operate. Thus, it is necessary for the user to push or pull the walking assist device 10 with a stronger force than in the assist mode 2 (AM2) in order to cause the walking assist device 10 to travel. Consequently, a load can be applied to operation (walk) of the body of the user performed as the user walks.

In the training mode 4 (TR4), the walking assist device 10 is caused to travel while causing the regenerated power collecting unit 65 to operate. Thus, it is necessary for the user to push or pull the walking assist device 10 with a stronger force than in the assist mode 1 (AM1) in order to cause the walking assist device 10 to travel. Consequently, a load can be applied to operation (walk) of the body of the user performed as the user walks.

FIG. 9 illustrates conditions for transitioning from the determination mode JDM to the various operation modes in FIG. 8 and conditions for returning to the determination mode JDM. In FIG. 9, conditions C1 to C6 are conditions for transitioning from the determination mode JDM to the various operation modes in FIG. 8, and conditions CR1 to CR6 are conditions for returning from the various operation modes to the determination mode JDM. In FIG. 9, the symbol "-" indicates that the state may be either "0" or "1".

A transition to the various operation modes is determined in accordance with the manual mode switching unit 76a (see FIG. 7), the state (see FIG. 1) of the movable handles (20R and 20L), and the state (see FIG. 1) of the fixed handles (20FR and 20FL). The conditions for transitioning from the various operation modes to the determination mode JDM are determined in accordance with the current operation mode, the state of the movable handles (20R and 20L), and the state of the fixed handles (20FR and 20FL).

In FIG. 9, the moving handle grasping state is "1=grasped" in the case where it is detected by the grasp detection units 25R and 25L (see FIG. 3) that the user is grasping any of the movable handles 20R and 20L, and "0=not grasped" in the case where it is detected that the user is not grasping any of the movable handles 20R and 20L.

The fixed handle grasping state is "1=grasped" in the case where it is detected by the grasp detection units 25FR and 25FL (see FIG. 6) that the user is grasping any of the fixed handles 20FR and 20FL, and "0=not grasped" in the case where it is detected that the user is not grasping any of the fixed handles 20FR and 20FL.

The state of arm swing with the movable handles 20R and 20L is "1=with arm swing" in the case where a detection signal with movement of the movable handle 20R or 20L is output from one of the right handle position detection unit 34R and the left handle position detection unit 34L, and "0=without arm swing" otherwise.

In the case where one of the conditions C1 to C6 is met, the drive control unit 40 changes the operation mode to an operation mode corresponding to the condition. Determination of a transition from the determination mode JDM to the various operation modes will be described in detail below.

In the case where the manual mode switching unit 76a selects the "assist mode", the moving handle grasping state is "0=not grasped", the arm swing state is "0=without arm swing", and the fixed handle grasping state is "1=grasped", the condition C1 is met, and the drive control unit 40 causes the operation mode to transition from the determination mode JDM to the assist mode 1 (AM1).

In the case where the manual mode switching unit 76a selects the "assist mode", the moving handle grasping state is "1=grasped", the arm swing state is "0=without arm swing", and the fixed handle grasping state is "0=grasped", the condition C2 is met, and the drive control unit 40 causes the operation mode to transition from the determination mode JDM to the assist mode 2 (AM2).

In the case where the manual mode switching unit 76a selects the "training mode 1", the moving handle grasping state is "1=grasped", the arm swing state is "1=with arm swing", and the fixed handle grasping state is "0=not grasped", the condition C3 is met, and the drive control unit 40 causes the operation mode to transition from the determination mode JDM to the training mode 1 (TR1).

In the case where the manual mode switching unit 76a selects the "training mode 2", the moving handle grasping state is "1=grasped", the arm swing state is "1=with arm swing", and the fixed handle grasping state is "0=not grasped", the condition C4 is met, and the drive control unit 40 causes the operation mode to transition from the determination mode JDM to the training mode 2 (TR2).

In the case where the manual mode switching unit 76a selects the "training mode 3", the moving handle grasping state is "1=grasped", the arm swing state is "0=without arm swing", and the fixed handle grasping state is "0=not grasped", the condition C5 is met, and the drive control unit 40 causes the operation mode to transition from the determination mode JDM to the training mode 3 (TR3).

In the case where the manual mode switching unit 76a selects the "training mode 3", the moving handle grasping state is "0=not grasped", the arm swing state is "0=without arm swing", and the fixed handle grasping state is "1=grasped", the condition C6 is met, and the drive control unit 40 causes the operation mode to transition from the determination mode JDM to the training mode 4 (TR4).

In the case where one of the conditions CR1 to CR6 is met, the drive control unit 40 finishes the current operation mode (see FIG. 8), and causes the operation mode to transition to the determination mode JDM. Determination of a transition from the various operation modes to the determination mode JDM will be described in detail below.

In the case where the current mode is the "assist mode 1 (AM1)" and the fixed handle grasping state is "0=not grasped", the condition CR1 is met irrespective of the other states, and the drive control unit 40 causes the operation mode to transition from the assist mode 1 (AM1) to the determination mode JDM.

In the case where the current mode is the "assist mode 2 (AM2)" and the movable handle grasping state is "0=not grasped", the condition CR2 is met irrespective of the other states, and the drive control unit 40 causes the operation mode to transition from the assist mode 2 (AM2) to the determination mode JDM.

In the case where the current mode is the "training mode 1 (TR1)" and the movable handle grasping state is "0=not grasped", the condition CR3 is met irrespective of the other states, and the drive control unit 40 causes the operation mode to transition from the training mode 1 (TR1) to the determination mode JDM.

In the case where the current mode is the "training mode 2 (TR2)" and the movable handle grasping state is "0=not grasped", the condition CR4 is met irrespective of the other states, and the drive control unit 40 causes the operation mode to transition from the training mode 2 (TR2) to the determination mode JDM.

In the case where the current mode is the "training mode 3 (TR3)" and the movable handle grasping state is "0=not grasped", the condition CR5 is met irrespective of the other states, and the drive control unit 40 causes the operation mode to transition from the training mode 3 (TR3) to the determination mode JDM.

In the case where the current mode is the "training mode 4 (TR4)" and the fixed handle grasping state is "0=not grasped", the condition CR6 is met irrespective of the other states, and the drive control unit 40 causes the operation mode to transition from the training mode 4 (TR4) to the determination mode JDM.

The process procedure for the drive control unit 40 has a process procedure according to the first embodiment and a process procedure according to the second embodiment. In the process procedure according to the first embodiment, the drive units 64R and 64L are controlled on the basis of the movement speeds of the movable handles 20R and 20L in the training mode 1 and the training mode 2 illustrated in FIG. 8. In the process procedure according to the second embodiment, the drive units 64R and 64L are controlled on the basis of the positions of the movable handles 20R and 20L in the training mode 1 and the training mode 2 illustrated in FIG. 8. First, the process procedure according to the first embodiment will be described with reference to FIGS. 10A to 17. FIG. 10A and FIG. 10B are flowcharts illustrating the procedure of the overall process in the process procedure according to the first embodiment for the drive control unit 40 (see FIG. 7) of the walking assist device 10 (see FIG. 1). The process procedure for the drive control unit 40 of the walking assist device 10 will be described with reference to the flowchart in FIG. 10A and FIG. 10B. The operation mode in each process is not given the symbol in FIG. 8 except where it is necessary for convenience of description.

The overall process for the drive control unit 40 is composed of processes of: acquiring each state through the state detection unit 80 (step S100); determining the operation mode on the basis of each acquired state (step S200); calculating a target travel speed at which the walking assist device 10 is caused to travel (steps S170 and S300 to S800); and driving the rear wheels 60RR and 60RL (see FIG. 1), which serve as drive wheels, so as to achieve the target travel speed (step S180). The drive control unit 40 executes the overall process at intervals of a predetermined time (e.g. at intervals of several milliseconds) when started.

Step S100 (acquisition of each state through the state detection unit 80) will be described in detail below.

In step S100, the drive control unit 40 acquires information (detection signal) from the state detection unit 80 (grasp portion state detection unit 81, body state detection unit 82, vehicle body state detection unit 83, and atmospheric state detection unit 84), and stores a variety of detected states (input states) in the storage unit 44. The drive control unit 40 calculates forward-direction evaluation speeds VRhf and VLhf and rearward-direction evaluation speeds VRhb and VLhb on the basis of the information which is acquired through the state detection unit 80, and stores such evaluation speeds in the storage unit 44. The drive control unit 40 finishes the acquisition of each state through the state detection unit (step S100), and returns to the overall process.

For example, the drive control unit 40 detects and stores the following input states in the storage unit 44 in step S100.

Fixed handle grasping state: whether or not the user is grasping any of the fixed handles 20FR and 20FL.

Fixed handle acting force: a force to push forward and pull rearward the fixed handles 20FR and 20FL which are grasped by the user.

Movable handle grasping state: whether or not the user is grasping any of the movable handles 20R and 20L.

Movable handle acting force: a force to push forward and pull rearward the movable handles 20R and 20L which are grasped by the user.

State of arm swing: whether or not the user is swinging his/her arms in the front-rear direction while grasping any of the movable handles 20R and 20L.

Movement widths (DR and DL): widths (corresponding to the arm swing width) by which the movable handles 20R and 20L are moved in the front-rear direction with respect to the rails 30R and 30L as the user walks while grasping the movable handles 20R and 20L and swinging his/her arms.

Forward-direction evaluation speeds (VRhf and VLhf): the speeds of movement in the forward direction of the movable handles 20R and 20L with respect to the frame 50.

Rearward-direction evaluation speeds (VRhb and VLhb): the speeds of movement in the rearward direction of the movable handles 20R and 20L with respect to the frame 50.

Heart rate and body temperature: the heart rate and the body temperature of the user during use of the walking assist device 10.

Travel speeds (VdR and VdL): the travel speeds of the rear wheels 60RR and 60RL to travel forward or rearward.

Acceleration: acceleration applied to the walking assist device 10 for each of the axes in the three directions, namely the X axis, the Y axis, and the Z axis.

Angular speeds: angular speeds for rotation about each of the axes in the three directions, namely the X axis, the Y axis, and the Z axis.

Accumulated walking time: accumulated time of walk of the user with the walking assist device 10 stored in the storage unit 44.

Accumulated walking distance: accumulated distance of walk of the user with the walking assist device 10 stored in the storage unit 44.

Outside temperature: the temperature of outside air around the walking assist device 10.

State of main switch 72: whether the main switch of the walking assist device 10 is on (operation enabled) or off (operation disabled).

State of manual mode switching unit 76a: operation mode of the walking assist device 10 selected by the user.

State of automatic mode switching unit switch 76b: whether the switch is on (automatic operation mode switching enabled) or off (automatic operation mode switching disabled).

Assist adjustment amount: the adjustment amount for adjusting the magnitude of an assist force in the assist mode.

Load adjustment amount: the adjustment amount for adjusting the magnitude of a load in the training mode.

In step S200 (determination of operation mode based on each acquired state), the drive control unit 40 reads each state acquired through the state detection unit and stored in the storage unit 44, determines the operation mode (see FIG. 8), the condition for which is met in accordance with FIG. 9, on the basis of such information, and proceeds to step S110 (see FIG. 10A).

In step S110, the drive control unit 40 proceeds to step S300 in the case where the determined operation mode is the assist mode 1 (AM1) (Yes), and proceeds to step S120 in the case where the determined operation mode is not the assist mode 1 (AM1) (No).

In step S120, the drive control unit 40 proceeds to step S400 in the case where the determined operation mode is the training mode 4 (TR4) (Yes), and proceeds to step S130 in the case where the determined operation mode is not the training mode 4 (TR4) (No).

In step S130, the drive control unit 40 proceeds to step S500 in the case where the determined operation mode is the assist mode 2 (AM2) (Yes), and proceeds to step S140 in the case where the determined operation mode is not the assist mode 2 (AM2) (No).

In step S140, the drive control unit 40 proceeds to step S600 in the case where the determined operation mode is the training mode 3 (TR3) (Yes), and proceeds to step S150 in the case where the determined operation mode is not the training mode 3 (TR3) (No).

In step S150, the drive control unit 40 proceeds to step S700 in the case where the determined operation mode is the training mode 1 (TR1) (Yes), and proceeds to step S160 in the case where the determined operation mode is not the training mode 1 (TR1) (No).

In step S160, the drive control unit 40 proceeds to step S800 in the case where the determined operation mode is the training mode 2 (TR2) (Yes), and proceeds to step S170 in the case where the determined operation mode is not the training mode 2 (TR2) (No).

In step S170, the drive control unit 40 sets the target travel speed for the walking assist device 10 to 0 (determination mode), and proceeds to step S180.

In step S180, the drive control unit 40 drives the rear wheels 60RR and 60RL by controlling the drive units 64R and 64L with the target travel speeds (VR and VL) for the walking assist device 10 set to target forward travel speeds (VfdR and VfdL), which are the target travel speeds for forward travel, in the case of forward travel, to target reverse travel speeds (VbdR and VbdL), which are the target travel speeds for reverse travel, in the case of reverse travel, and to "0" otherwise, and finishes the overall process.

[S300] illustrated in FIG. 11 is a flowchart illustrating the procedure of processes in the assist mode 1 (AM1) in the drive control unit 40 of the walking assist device 10 (see FIGS. 1, 7, and 8). Step S300 (processes in the assist mode 1) will be described with reference to the flowchart of [S300] illustrated in FIG. 11.

In step S310, the drive control unit 40 proceeds to step S320 in the case where the acting force of the user applied to the fixed handles 20FR and 20FL is in the forward direction (Yes) on the basis of information from the fixed handle acting force detection unit 81c, and proceeds to step S330 in the case where the acting force of the user applied to the fixed handles 20FR and 20FL is not in the forward direction (No).

In step S320, the drive control unit 40 calculates the target forward travel speeds (VfdR and VfdL) which match the acting force applied to the fixed handles 20FR and 20FL and the assist amount which is derived by the load amount/assist amount change unit 74, finishes the processes in the assist mode 1 (step S300), and returns to the overall process.

In step S330, the drive control unit 40 calculates the target rearward travel speeds (VbdR and VbdL) which match the acting force applied to the fixed handles 20FR and 20FL and the assist amount which is derived by the load amount/assist amount change unit 74, finishes the processes in the assist mode 1 (step S300), and returns to the overall process.

In the assist mode 1 (AM1) (see FIG. 8), the walking assist device 10 can be caused to travel with an assist force that is larger by a predetermined amount than an assist force with which operation (walk) of the body of the user performed as the user walks is equivalent to operation in a no-load state. Consequently, the load on operation (walk) of the body of the user performed as the user walks can be alleviated.

[S400] illustrated in FIG. 11 is a flowchart illustrating the procedure of processes in the training mode 4 (TR4) in the drive control unit 40 of the walking assist device 10 (see FIGS. 1, 7, and 8). Step S400 (processes in the training mode 4) will be described with reference to the flowchart of [S400] illustrated in FIG. 11. With the regenerated power collecting unit 65 operating, the walking assist device 10 is not caused to generate an assist force in accordance with the acting force of the user.

In step S410, the drive control unit 40 proceeds to step S420 in the case where the acting force of the user applied to the fixed handles 20FR and 20FL is in the forward direction (Yes) on the basis of information from the fixed handle acting force detection unit 81c, and proceeds to step S430 in the case where the acting force of the user applied to the fixed handles 20FR and 20FL is not in the forward direction (No).

In step S420, the drive control unit 40 calculates the target forward travel speeds (VfdR and VfdL) which match the acting force applied to the fixed handles 20FR and 20FL, finishes the processes in the training mode 4 (step S400), and returns to the overall process.

In step S430, the drive control unit 40 calculates the target rearward travel speeds (VbdR and VbdL) which match the acting force applied to the fixed handles 20FR and 20FL, finishes the processes in the training mode 4 (step S400), and returns to the overall process.

In the training mode 4 (TR4) (see FIG. 8), in order to cause the walking assist device 10 to travel with the regenerated power collecting unit 65 operating, it is necessary for the user to push or pull the walking assist device 10 with a stronger force in order to cause the walking assist device 10 to travel than in the assist mode 1 (AM1). Consequently, a load can be applied to operation (walk) of the body of the user performed as the user walks.

Figure 12:
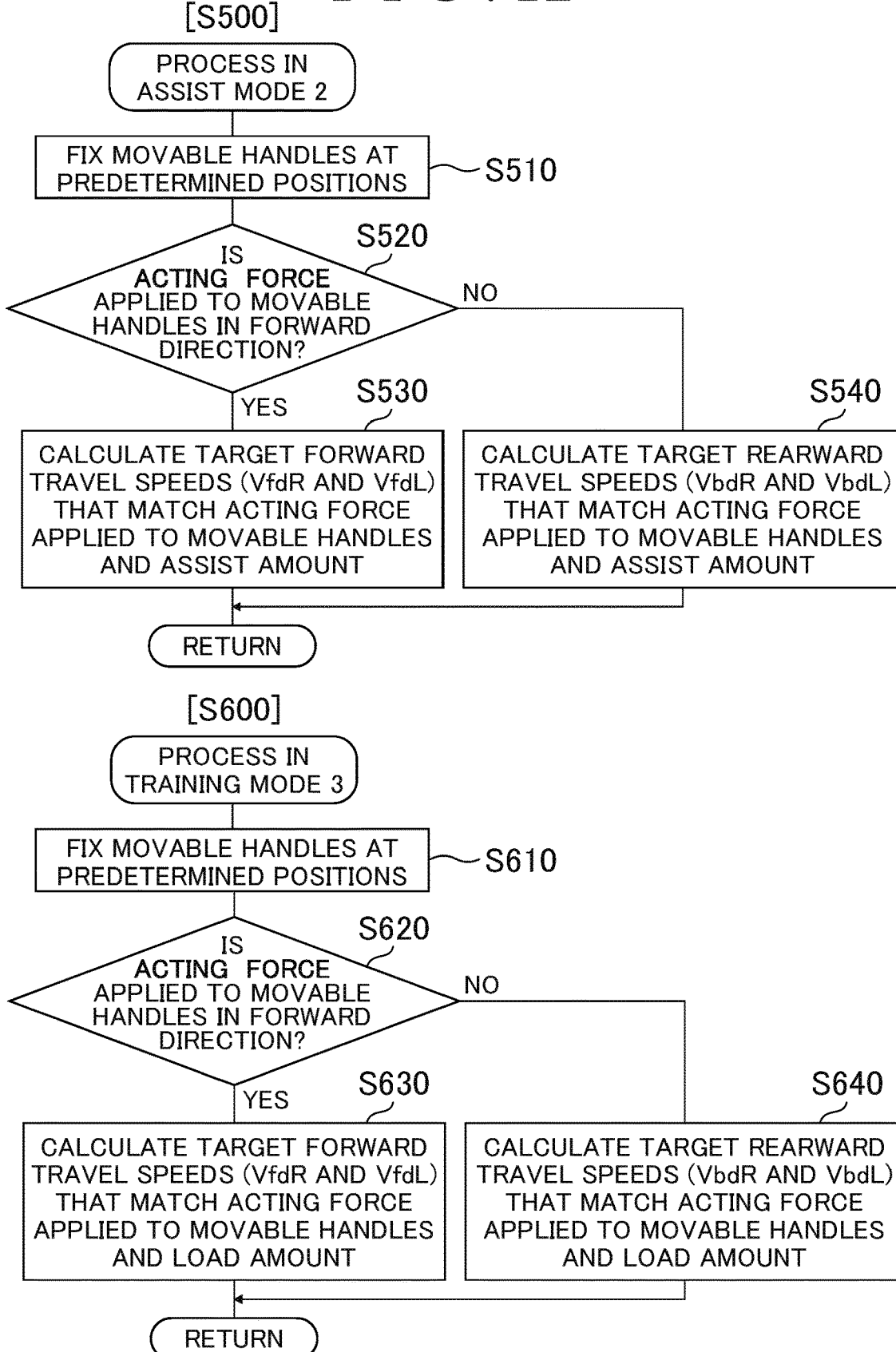
FIG. 12 is a flowchart illustrating the procedure of processes in an assist mode 2 and a training mode 3 in the drive control unit of the walking assist device.

[S500] illustrated in FIG. 12 is a flowchart illustrating the procedure of processes in the assist mode 2 (AM2) in the drive control unit 40 of the walking assist device 10 (see FIGS. 1, 7, and 8). Step S500 (processes in the assist mode 2) will be described with reference to the flowchart of [S500] illustrated in FIG. 12.

In step S510, the drive control unit 40 fixes the movable handles 20R and 20L at predetermined positions by limiting movement thereof on the rails 30R and 30L using the handle movement limiting units 35R and 35L by driving the motors 32R and 32L, and proceeds to step S520.

In step S520, the drive control unit 40 proceeds to step S530 in the case where the acting force of the user applied to the movable handles 20R and 20L is in the forward direction (Yes) on the basis of information from the movable handle acting force detection unit 81*a*, and proceeds to step S540 in the case where the acting force of the user applied to the movable handles 20R and 20L is not in the forward direction (No).

In step S530, the drive control unit 40 calculates the target forward travel speeds (VfdR and VfdL) which match the acting force applied to the movable handles 20R and 20L and the assist amount which is derived by the load amount/assist amount change unit 74, finishes the processes in the assist mode 2 (step S500), and returns to the overall process.

In step S540, the drive control unit 40 calculates the target rearward travel speeds (VbdR and VbdL) which match the acting force applied to the movable handles 20R and 20L and the assist amount which is derived by the load amount/assist amount change unit 74, finishes the processes in the assist mode 2 (step S500), and returns to the overall process.

In the assist mode 2 (AM2), the walking assist device 10 can be caused to travel with an assist force that is larger by a predetermined amount than an assist force with which operation (walk) of the body of the user performed as the user walks is equivalent to operation in a no-load state. Consequently, the load on operation (walk) of the body of the user performed as the user walks can be alleviated.

[S600] illustrated in FIG. 12 is a flowchart illustrating the procedure of processes in the training mode 3 (TR3) in the drive control unit 40 of the walking assist device 10 (see FIGS. 1, 7, and 8). Step S600 (processes in the training mode 3) will be described with reference to the flowchart of [S600] illustrated in FIG. 12. With the regenerated power collecting unit 65 operating, the walking assist device 10 is not caused to generate an assist force in accordance with the acting force of the user.

In step S610, the drive control unit 40 fixes the movable handles 20R and 20L at predetermined positions by limiting movement thereof on the rails 30R and 30L using the handle movement limiting units 35R and 35L by driving the motors 32R and 32L, and proceeds to step S620.

In step S620, the drive control unit 40 proceeds to step S630 in the case where the acting force of the user applied to the movable handles 20R and 20L is in the forward direction (Yes) on the basis of information from the movable handle acting force detection unit 81*a*, and proceeds to step S640 in the case where the acting force of the user applied to the movable handles 20R and 20L is not in the forward direction (No).

In step S630, the drive control unit 40 calculates the target forward travel speeds (VfdR and VfdL) which match the acting force applied to the movable handles 20R and 20L, finishes the processes in the training mode 3 (step S600), and returns to the overall process.

In step S640, the drive control unit 40 calculates the target rearward travel speeds (VbdR and VbdL) which match the acting force applied to the movable handles 20R and 20L, finishes the processes in the training mode 3 (step S600), and returns to the overall process.

In the training mode 3 (TR3) (see FIG. 8), in order to cause the walking assist device 10 to travel with the regenerated power collecting unit 65 operating, it is necessary for the user to push or pull the walking assist device 10 with a stronger force in order to cause the walking assist device 10 to travel than in the assist mode 2 (AM2). Consequently, a load can be applied to operation (walk) of the body of the user performed as the user walks.

Figure 13A:
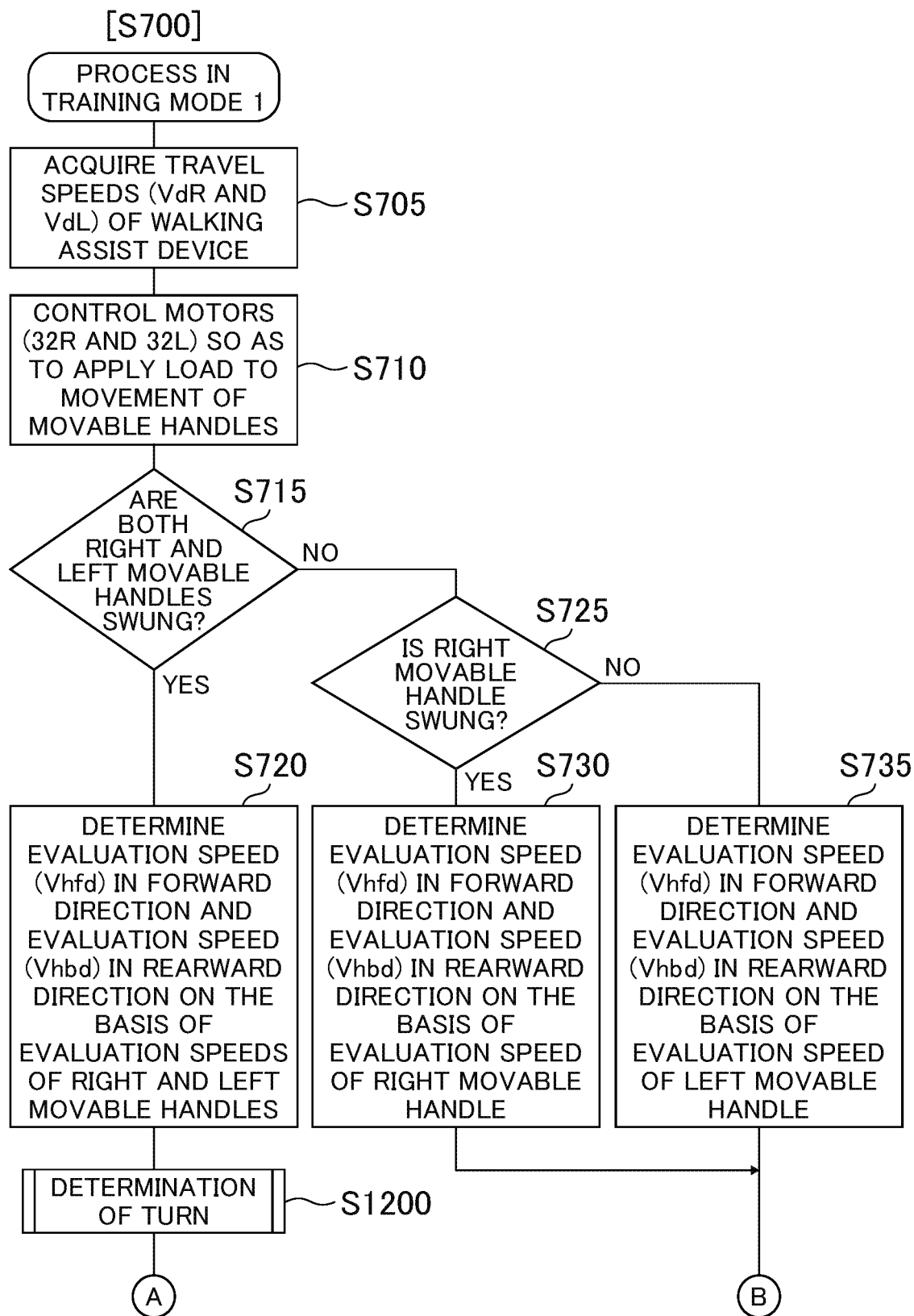
FIG. 13A is a flowchart illustrating the procedure of processes in a training mode 1 in the drive control unit of the walking assist device.
Figure 13B:
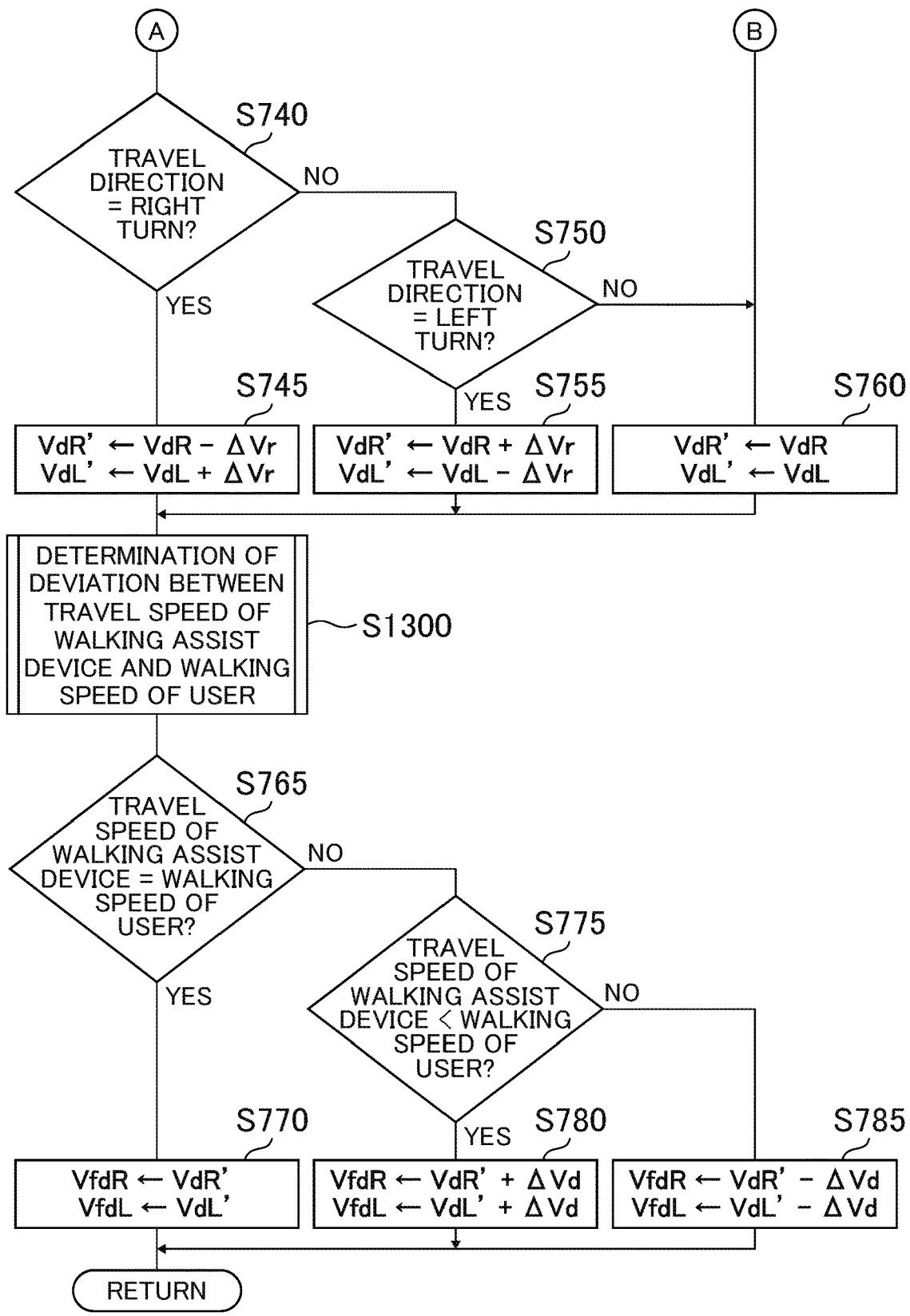
FIG. 13B is a flowchart illustrating the procedure of processes in a training mode 1 in the drive control unit of the walking assist device.

FIG. 13A and FIG. 13B are flowcharts illustrating the procedure of processes in the training mode 1 (TR1) in the drive control unit 40 of the walking assist device 10 (see FIGS. 1, 7, and 8). Step S700 (processes in the training mode 1) will be described with reference to the flowchart in FIG. 13A and FIG. 13B. With the regenerated power collecting unit 65 operating, an assist force is not generated in accordance with the acting force of the user.

In step S705, the drive control unit 40 acquires the travel speeds (VdR and VdL) of the walking assist device 10 from the storage unit 44, and proceeds to step S710.

In step S710, the drive control unit 40 controls the motors 32R and 32L so as to apply a load with a load amount derived by the load amount/assist amount change unit 74 to movement of the movable handles 20R and 20L, and proceeds to step S715.

In step S715, the drive control unit 40 proceeds to step S720 in the case where both the right movable handle 20R and the left movable handle 20L are moved, that is, both the right and left arms are swung (Yes), on the basis of information from the movable handle movement amount detection unit 81*b*, and proceeds to step S725 in the case where both the right and left arms are not swung (No).

In step S720, the drive control unit 40 determines an evaluation speed Vhfd in the forward direction and an evaluation speed Vhbd in the rearward direction on the basis of the evaluation speeds (VRhf, VRhb, VLhf, and VLhb) of the right and left movable handles 20R and 20L, and proceeds to step S1200 (determination of a turn). In the case where the amount of movement of the right movable handle 20R is "positive" and the amount of movement of the left movable handle 20L is "negative" (in the case where the right arm of the user is swung in the forward direction and the left arm of the user is swung in the rearward direction), the evaluation speed Vhfd in the forward direction is determined as the forward-direction evaluation speed VRhf, and the evaluation speed Vhbd in the rearward direction is determined as the rearward-direction evaluation speed VLhb. In the case where the amount of movement of the right movable handle 20R is "negative" and the amount of movement of the left movable handle 20L is "positive" (in the case where the left arm of the user is swung in the forward direction and the right arm of the user is swung in the rearward direction), the evaluation speed Vhfd in the forward direction is determined as the forward-direction evaluation speed VLhf, and the evaluation speed Vhbd in the rearward direction is determined as the rearward-direction evaluation speed VRhb.

In step S725, the drive control unit 40 proceeds to step S730 in the case where only the right movable handle 20R is moved, that is, the right arm is swung (Yes), on the basis of information from the movable handle movement amount detection unit 81*b*, and proceeds to step S735 in the case where the right arm is not swung (No).

In step S730, the drive control unit 40 determines an evaluation speed (Vhfd=VRhf) in the forward direction and an evaluation speed (Vhbd=VRhb) in the rearward direction on the basis of the evaluation speeds (forward-direction evaluation speed VRhf and rearward-direction evaluation speed VRhb) of the right movable handle 20R, and proceeds to step S760.

In step S735, the drive control unit 40 determines an evaluation speed (Vhfd=VLhf) in the forward direction and an evaluation speed (Vhbd=VLhb) in the rearward direction on the basis of the evaluation speeds (forward-direction evaluation speed VLhf and rearward-direction evaluation speed VLhb) of the left movable handle 20L, and proceeds to step S760.

In step S740, the drive control unit 40 proceeds to step S745 in the case where the travel direction of the walking assist device 10 is a right turn (Yes), and proceeds to step S750 in the case where the travel direction is not a right turn (No).

In step S745, the drive control unit 40 sets a target travel speed VdR' for the rear wheel 60RR, which serves as the right drive wheel of the walking assist device 10, to VdR−ΔVr (predetermined speed), sets a target travel speed VdL' for the rear wheel 60RL, which serves as the left drive wheel, to VdL+ΔVr (predetermined speed), and proceeds to step S1300 (determination of the deviation between the travel speed of the walking assist device and the walking speed of the user). ΔVr is a predetermined speed corresponding to the travel speeds (VdR and VdL), and is stored in the storage unit 44 in advance.

In step S750, the drive control unit 40 proceeds to step S755 in the case where the travel direction of the walking assist device 10 is a left turn (Yes), and proceeds to step S760 in the case where the travel direction is not a left turn (No).

In step S755, the drive control unit 40 sets the target travel speed VdR' for the rear wheel 60RR, which serves as the right drive wheel of the walking assist device 10, to VdR+ΔVr (predetermined speed), sets the target travel speed VdL' for the rear wheel 60RL, which serves as the left drive wheel, to VdL−ΔVr (predetermined speed), and proceeds to step S1300 (determination of the deviation between the travel speed of the walking assist device and the walking speed of the user).

In step S760, the drive control unit 40 sets the target travel speed VdR' for the rear wheel 60RR, which serves as the right drive wheel of the walking assist device 10, to VdR, sets the target travel speed VdL' for the rear wheel 60RL, which serves as the left drive wheel, to VdL, and proceeds to step S1300 (determination of the deviation between the travel speed of the walking assist device and the walking speed of the user).

In step S765, the drive control unit 40 proceeds to step S770 in the case where the travel speed of the walking assist device 10 is the same as the walking speed of the user (Yes), and proceeds to step S775 in the case where the travel speed of the walking assist device 10 is not the same as the walking speed of the user (No).

In step S770, the drive control unit 40 sets the target forward travel speed VfdR for the rear wheel 60RR, which serves as the right drive wheel of the walking assist device 10, to VdR', sets the target forward travel speed VfdL for the rear wheel 60RL, which serves as the left drive wheel, to VdL', finishes the processes in the training mode 1 (step S700), and returns to the overall process.

In step S775, the drive control unit 40 proceeds to step S780 in the case where the travel speed of the walking assist device 10 is lower than the walking speed of the user (Yes), and proceeds to step S785 in the case where the travel speed of the walking assist device 10 is not lower than the walking speed of the user (No).

In step S780, the drive control unit 40 sets the target forward travel speed VfdR for the rear wheel 60RR, which serves as the right drive wheel of the walking assist device 10, to VdR'+ΔVd (predetermined speed), sets the target forward travel speed VfdL for the rear wheel 60RL, which serves as the left drive wheel, to VdL'+ΔVd (predetermined speed), finishes the processes in the training mode 1 (step S700), and returns to the overall process. ΔVd is a predetermined speed corresponding to the target travel speeds (VdR' and VdL'), and is stored in the storage unit 44 in advance.

In step S785, the drive control unit 40 sets the target forward travel speed VfdR for the rear wheel 60RR, which serves as the right drive wheel of the walking assist device 10, to VdR'ΔVd, sets the target forward travel speed VfdL for the rear wheel 60RL, which serves as the left drive wheel, to VdL'−ΔVd, finishes the processes in the training mode 1 (step S700), and returns to the overall process.

In the training mode 1 (TR1) (see FIG. 8), the walking assist device 10 can be caused to travel by applying a load to movement of the movable handles 20R and 20L in the front-rear direction through the motors 32R and 32L. Consequently, a load can be applied to operation (arm swing) of the body of the user performed as the user walks.

Even in the case where a failure is caused in one of the movable handle 20R and the movable handle 20L according to the movable handle acting force detection unit 81*a* and the movable handle movement amount detection unit 81*b*, the drive control unit 40 can cause the walking assist device 10 to travel using the other movable handle through the control discussed above.

In the case where the user desires to cause the walking assist device 10 to make a right turn, he/she swings the left movable handle 20L back and forth more greatly than the right movable handle 20R. Therefore, the drive control unit 40 determines a right turn, controls the drive unit 64L such that the rear wheel 60RL, which serves as the left drive wheel, is faster than the target travel speed by the predetermined speed (ΔVr), and controls the drive unit 64R such that the rear wheel 60RR, which serves as the right drive wheel, is slower than the target travel speed by the predetermined speed (ΔVr).

In the case where the user desires to cause the walking assist device 10 to make a left turn, he/she swings the right movable handle 20R back and forth more greatly than the left movable handle 20L. Therefore, the drive control unit 40 determines a left turn, controls the drive unit 64R such that the rear wheel 60RR, which serves as the right drive wheel, is faster than the target travel speed by the predetermined speed (ΔVr), and controls the drive unit 64L such that the rear wheel 60RL, which serves as the left drive wheel, is slower than the target travel speed by the predetermined speed (ΔVr).

Even in the case where a failure is caused in one of the movable handle 20R and the movable handle 20L according to the movable handle acting force detection unit 81*a* and the movable handle movement amount detection unit 81*b*, the drive control unit 40 can correct the deviation between the travel speed of the walking assist device 10 and the walking speed of the user using the other movable handle through the control discussed above.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. Thus, in order to correct the deviation between the travel speed of the walking assist device and the walking speed of the user, in the case where the walking speed of the user is higher than the travel speed of the walking assist device 10, the drive control unit 40 sets the target travel speed VdR' for the rear wheel 60RR, which serves as the right drive wheel of the walking assist device, to VdR'+ΔVd (predetermined speed), and sets the target travel speed VdL' for the rear wheel 60RL, which serves as the left drive wheel, to VdL'+ΔVd (predetermined speed). Consequently, the deviation between the travel speed of the walking assist device and the walking speed of the user can be corrected.

Figure 14A:
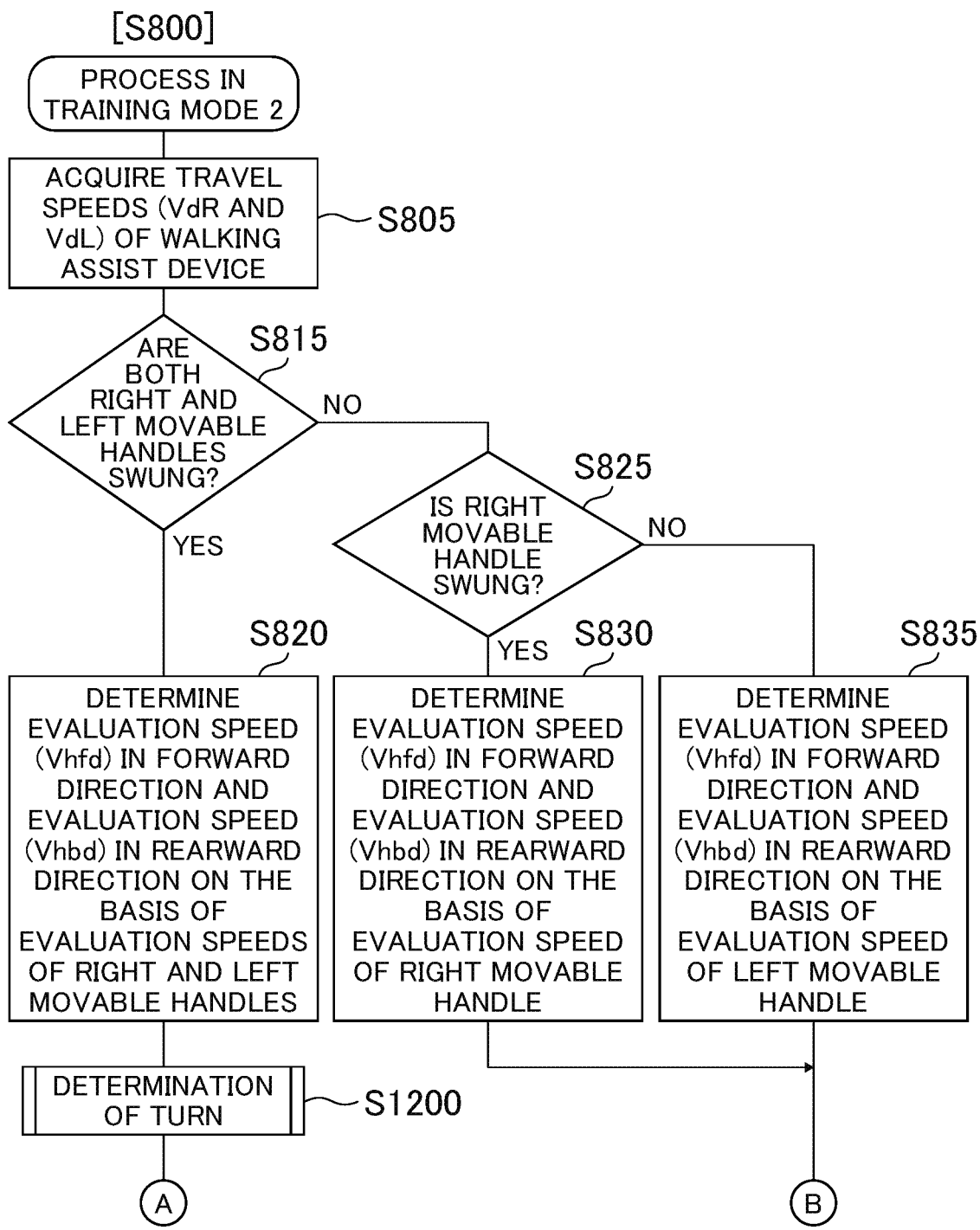
FIG. 14A is a flowchart illustrating the procedure of processes in a training mode 2 in the drive control unit of the walking assist device.
Figure 14B:
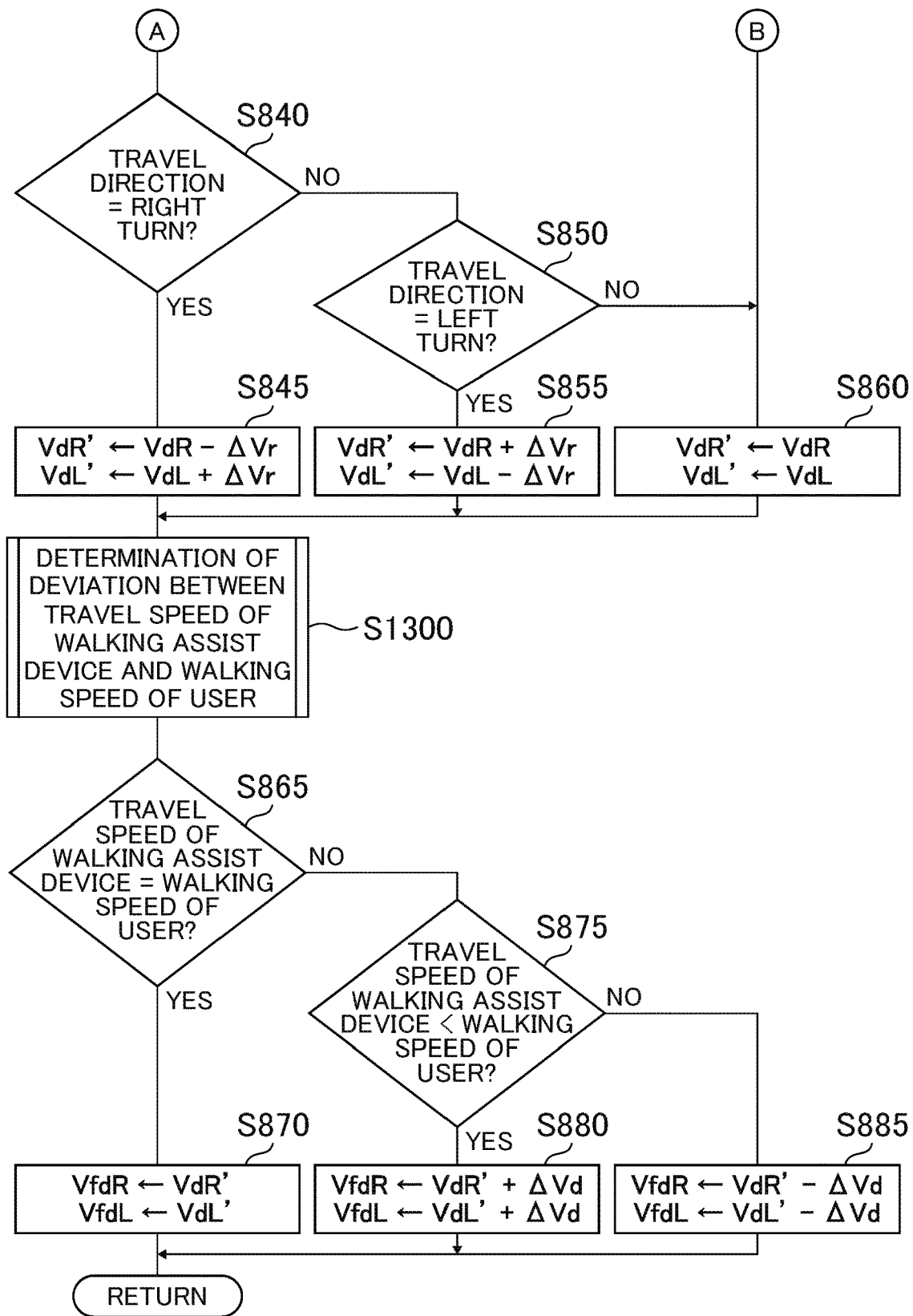
FIG. 14B is a flowchart illustrating the procedure of processes in a training mode 2 in the drive control unit of the walking assist device.

FIG. 14A and FIG. 14B are flowcharts illustrating the procedure of processes in the training mode 2 (TR2) in the drive control unit 40 of the walking assist device 10 (see FIGS. 1, 7, and 8). Step S800 (processes in the training mode 2) will be described with reference to the flowchart in FIG. 14A and FIG. 14B. The processes in the training mode 2 are the same as those in step S700 (processes in the training mode 1) except for the control (step S710) for the motors (32R and 32L) for applying a load to movement of the movable handles.

In step S805, the drive control unit 40 acquires the travel speeds (VdR and VdL) of the walking assist device 10 from the storage unit 44, and proceeds to step S815.

In step S815, the drive control unit 40 proceeds to step S820 in the case where both the right movable handle 20R and the left movable handle 20L are moved, that is, both the right and left arms are swung (Yes), on the basis of information from the movable handle movement amount detection unit 81b, and proceeds to step S825 in the case where both the right and left arms are not swung (No).

In step S820, the drive control unit 40 determines an evaluation speed Vhfd in the forward direction and an evaluation speed Vhbd in the rearward direction on the basis of the evaluation speeds (VRhf, VRhb, VLhf, and VLhb) of the right and left movable handles 20R and 20L, and proceeds to step S1200 (determination of a turn). In the case where the amount of movement of the right movable handle 20R is "positive" and the amount of movement of the left movable handle 20L is "negative" (in the case where the right arm of the user is swung in the forward direction and the left arm of the user is swung in the rearward direction), the evaluation speed Vhfd in the forward direction is determined as the forward-direction evaluation speed VRhf, and the evaluation speed Vhbd in the rearward direction is determined as the rearward-direction evaluation speed VLhb. In the case where the amount of movement of the right movable handle 20R is "negative" and the amount of movement of the left movable handle 20L is "positive" (in the case where the left arm of the user is swung in the forward direction and the right arm of the user is swung in the rearward direction), the evaluation speed Vhfd in the forward direction is determined as the forward-direction evaluation speed VLhf, and the evaluation speed Vhbd in the rearward direction is determined as the rearward-direction evaluation speed VRhb.

In step S825, the drive control unit 40 proceeds to step S830 in the case where only the right movable handle 20R is moved, that is, the right arm is swung (Yes), on the basis of information from the movable handle movement amount detection unit 81b, and proceeds to step S835 in the case where the right arm is not swung (No).

In step S830, the drive control unit 40 determines an evaluation speed (Vhfd=VRhf) in the forward direction and an evaluation speed (Vhbd=VRhb) in the rearward direction on the basis of the evaluation speeds (forward-direction evaluation speed VRhf and rearward-direction evaluation speed VRhb) of the right movable handle 20R, and proceeds to step S860.

In step S835, the drive control unit 40 determines an evaluation speed (Vhfd=VLhf) in the forward direction and an evaluation speed (Vhbd=VLhb) in the rearward direction on the basis of the evaluation speeds (forward-direction evaluation speed VLhf and rearward-direction evaluation speed VLhb) of the left movable handle 20L, and proceeds to step S860.

In step S840, the drive control unit 40 proceeds to step S845 in the case where the travel direction of the walking assist device 10 is a right turn (Yes), and proceeds to step S850 in the case where the travel direction is not a right turn (No).

In step S845, the drive control unit 40 sets a target travel speed VdR' for the rear wheel 60RR, which serves as the right drive wheel of the walking assist device 10, to VdR−ΔVr (predetermined speed), sets a target travel speed VdL' for the rear wheel 60RL, which serves as the left drive wheel, to VdL+ΔVr (predetermined speed), and proceeds to step S1300 (determination of the deviation between the travel speed of the walking assist device 10 and the walking speed of the user). ΔVr is a predetermined speed corresponding to the travel speeds (VdR and VdL), and is stored in the storage unit 44 in advance.

In step S850, the drive control unit 40 proceeds to step S855 in the case where the travel direction of the walking assist device 10 is a left turn (Yes), and proceeds to step S860 in the case where the travel direction is not a left turn (No).

In step S855, the drive control unit 40 sets the target travel speed VdR' for the rear wheel 60RR, which serves as the right drive wheel of the walking assist device 10, to VdR+ΔVr (predetermined speed), sets the target travel speed VdL' for the rear wheel 6ORL, which serves as the left drive wheel, to VdL−ΔVr (predetermined speed), and proceeds to step S1300 (determination of the deviation between the travel speed of the walking assist device and the walking speed of the user).

In step S860, the drive control unit 40 sets the target travel speed VdR' for the rear wheel 60RR, which serves as the right drive wheel of the walking assist device 10, to VdR, sets the target travel speed VdL' for the rear wheel 60RL, which serves as the left drive wheel, to VdL, and proceeds to step S1300 (determination of the deviation between the travel speed of the walking assist device 10 and the walking speed of the user).

In step S865, the drive control unit 40 proceeds to step S870 in the case where the travel speed of the walking assist device 10 is the same as the walking speed of the user (Yes), and proceeds to step S875 in the case where the travel speed of the walking assist device 10 is not the same as the walking speed of the user (No).

In step S870, the drive control unit 40 sets the target forward travel speed VfdR for the rear wheel 60RR, which serves as the right drive wheel of the walking assist device 10, to VdR', sets the target forward travel speed VfdL for the rear wheel 6ORL, which serves as the left drive wheel, to VdL', finishes the processes in the training mode 2 (step S800), and returns to the overall process.

In step S875, the drive control unit 40 proceeds to step S880 in the case where the travel speed of the walking assist device 10 is lower than the walking speed of the user (Yes), and proceeds to step S885 in the case where the travel speed of the walking assist device 10 is not lower than the walking speed of the user (No).

In step S880, the drive control unit 40 sets the target forward travel speed VfdR for the rear wheel 60RR, which serves as the right drive wheel of the walking assist device 10, to VdR'+ΔVd (predetermined speed), sets the target forward travel speed VfdL for the rear wheel 60RL, which serves as the left drive wheel, to VdL'+ΔVd (predetermined speed), finishes the processes in the training mode 2 (step S800), and returns to the overall process. ΔVd is a predetermined speed corresponding to the target travel speeds (VdR' and VdL'), and is stored in the storage unit 44 in advance.

In step S885, the drive control unit 40 sets the target forward travel speed VfdR for the rear wheel 60RR, which serves as the right drive wheel of the walking assist device 10, to VdR'−ΔVd, sets the target forward travel speed VfdL for the rear wheel 60RL, which serves as the left drive wheel, to VdL'−ΔVd, finishes the processes in the training mode 2 (step S800), and returns to the overall process.

In the training mode 2 (TR2) (see FIG. 8), no load is applied to the movable handles 20R and 20L, and the walking assist device 10 can be caused to travel with an assist force with which operation (walk) of the body of the user performed as the user walks is equivalent to operation in a no-load state.

Even in the case where a failure is caused in one of the movable handle 20R and the movable handle 20L according to the movable handle acting force detection unit 81a and the movable handle movement amount detection unit 81b, the drive control unit 40 can cause the walking assist device 10 to travel using the other movable handle through the control discussed above.

In the case where the user desires to cause the walking assist device 10 to make a right turn, he/she swings the left movable handle 20L back and forth more greatly than the right movable handle 20R. Therefore, the drive control unit 40 determines a right turn, controls the drive unit 64L such that the left rear wheel 60RL is faster than the target travel speed by the predetermined speed (ΔVr), and controls the drive unit 64R such that the right rear wheel 60RR is slower than the target travel speed by the predetermined speed (ΔVr).

Even in the case where a failure is caused in information on one of the movable handle 20R and the movable handle 20L according to the movable handle acting force detection unit 81a and the movable handle movement amount detection unit 81b, the drive control unit 40 can correct the deviation between the travel speed of the walking assist device 10 and the walking speed of the user on the basis of information on the other movable handle through the control discussed above.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. Thus, in order to correct the deviation between the travel speed of the walking assist device 10 and the walking speed of the user, in the case where the walking speed of the user is higher than the travel speed of the walking assist device 10, the drive control unit 40 sets the target travel speed VdR' for the rear wheel 60RR, which serves as the right drive wheel of the walking assist device, to VdR'+ΔVd (predetermined speed), and sets the target travel speed VdL' for the rear wheel 6ORL, which serves as the left drive wheel, to VdL'+ΔVd (predetermined speed). Consequently, the deviation between the travel speed of the walking assist device and the walking speed of the user can be corrected.

Figure 15A:
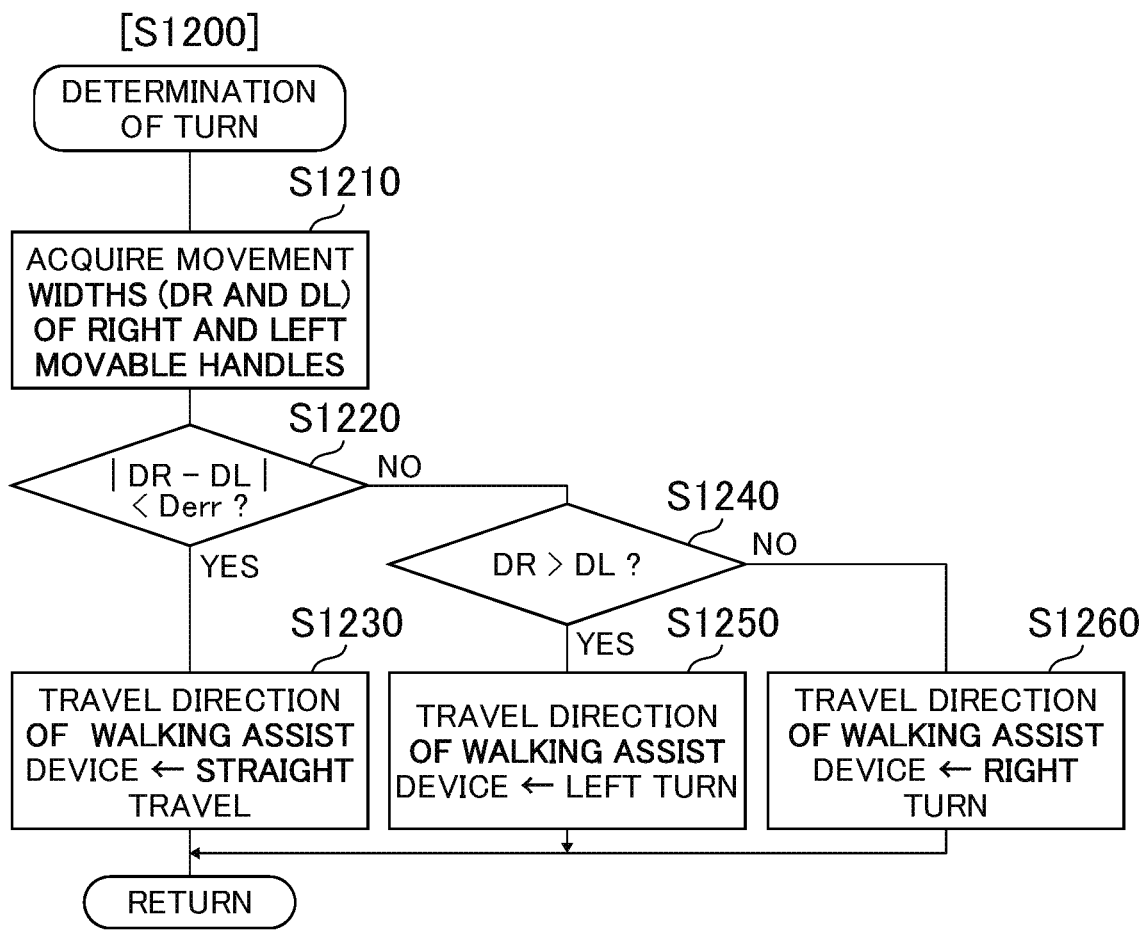
FIG. 15A is a flowchart illustrating the procedure of processes for determination of a turn and determination of the deviation between the travel speed of the walking assist device and the walking speed of a user in the drive control unit of the walking assist device.

[S1200] illustrated in FIG. 15A is a flowchart illustrating the procedure of processes for determination of a turn in the drive control unit 40 of the walking assist device 10 (see FIGS. 1 and 7). Step S1200 (determination of a turn) will be described with reference to the flowchart of [S1200] illustrated in FIG. 15A.

In step S1210, the drive control unit 40 acquires the width of movement DR of the right movable handle 20R and the width of movement DL of the left movable handle 20L from the storage unit 44, and proceeds to step S1220.

In step S1220, the drive control unit 40 proceeds to step S1230 in the case where the absolute value |DR−DL| of the difference between the width of movement DR of the right movable handle 20R and the width of movement DL of the left movable handle 20L is less than Derr set in advance (Yes; determined as straight travel), and proceeds to step S1240 in the case where |DR−DL| is not less than Derr (No). Derr is a predetermined value determined in advance, and is stored in the storage unit 44.

In step S1230, the drive control unit 40 sets the travel direction of the walking assist device 10 to "straight travel", and finishes the determination of a turn (step S1200). The drive control unit 40 proceeds to step S740 in the case where step S1200 is called in step S700, and proceeds to step S840 in the case where step S1200 is called in step S800.

In step S1240, the drive control unit 40 proceeds to step S1250 in the case where the width of movement DR is larger than the width of movement DL (Yes; determined as a left turn), and proceeds to step S1260 in the case where the width of movement DR is not larger than the width of movement DL (No; determined as a right turn).

In step S1250, the drive control unit 40 sets the travel direction of the walking assist device 10 to a left turn, and finishes the determination of a turn (step S1200). The drive control unit 40 proceeds to step S740 in the case where step S1200 is called in step S700, and proceeds to step S840 in the case where step S1200 is called in step S800.

In step S1260, the drive control unit 40 sets the travel direction of the walking assist device 10 to a right turn, and finishes the determination of a turn (step S1200). The drive control unit 40 proceeds to step S740 in the case where step S1200 is called in step S700, and proceeds to step S840 in the case where step S1200 is called in step S800.

In the case where the user desires to cause the walking assist device 10 to make a right turn, he/she swings the left movable handle 20L back and forth more greatly than the right movable handle 20R, and therefore the drive control unit 40 determines a right turn. In the case where the user desires to cause the walking assist device 10 to make a left turn, he/she swings the right movable handle 20R back and forth more greatly than the left movable handle 20L, and therefore the drive control unit 40 determines a left turn.

[S1300] illustrated in FIG. 15B is a flowchart illustrating the procedure of processes for determination of the deviation between the travel speed of the walking assist device 10 and the walking speed of the user in the drive control unit 40 of the walking assist device 10 (see FIGS. 1 and 7). Step S1300 (determination of the deviation between the travel speed of the walking assist device 10 and the walking speed of the user) will be described with reference to the flowchart of [S1300] illustrated in FIG. 15B.

In step S1320, the drive control unit 40 determines whether or not the absolute value |Vhfd+Vhbd| of the difference between the evaluation speed Vhfd in the forward direction and the evaluation speed Vhbd in the rearward direction is less than ΔVerr which is set in advance as a first determination condition. The drive control unit 40 determines that the first determination condition is "Yes" in the case where the absolute value |Vhfd 30 Vhbd| is less than ΔVerr, and determines that the first determination condition is "No" otherwise. The drive control unit 40 also determines, on the basis of information from the grasp portion state detection unit 81, whether or not the movable handles 20R and 20L are moved to the vicinity of the front end, or the vicinity of the rear end, of the rail slit portions 38 of the rails (30R and 30L) as a second determination condition. The drive control unit 40 determines that the second determination condition is "Yes" in the case where both the movable handles 20R and 20L are not moved to the vicinity of the front end (vicinity of the front end portion), or the vicinity of the rear end (vicinity of the rear end portion), of the rail slit portions 38, and determines that the second determination condition is "No" otherwise. The drive control unit 40 proceeds to step S1330 in the case where the first determination condition is "Yes" and the second determination condition is "Yes" (Yes), and proceeds to step S1340 otherwise (No). The evaluation speed Vhfd in the forward direction is defined as "positive", and the evaluation speed Vhbd in the rearward direction is defined as "negative". Therefore, the difference between such speeds is the sum thereof (Vhfd+Vhbd).

In step S1330, the drive control unit 40 sets the travel speed of the walking assist device 10 to be "the same as the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

In step S1340, the drive control unit 40 determines whether or not the absolute value |Vhfd| of the evaluation speed in the forward direction is larger than the absolute value |Vhbd| of the evaluation speed in the rearward direction as a first determination condition. The drive control unit 40 determines that the first determination condition is "Yes" in the case where the absolute value |Vhfd| is larger than the absolute value |Vhbd|, and determines that the first determination condition is "No" otherwise. The drive control unit 40 also determines on the basis of information from the grasp portion state detection unit 81 whether or not the movable handle 20R or the movable handle 20L is moved to the vicinity of the front end of the rail slit portion 38 of the rail (30R or 30L) as a second determination condition. The drive control unit 40 determines that the second determination condition is "Yes" in the case where the movable handle 20R or the movable handle 20L is moved to the vicinity of the front end of the rail slit portion 38, and determines that the second determination condition is "No" otherwise.

In step S1350, the drive control unit 40 sets the travel speed of the walking assist device to be "lower than the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

In step S1360, the drive control unit 40 sets the travel speed of the walking assist device 10 to be "higher than the walking speed of the user", and finishes the determination of the deviation between the travel speed of the walking assist device 10 and the walking speed of the user (step S1300). The drive control unit 40 proceeds to step S765 in the case where step S1300 is called in step S700, and proceeds to step S865 in the case where step S1300 is called in step S800.

The determinations in step S1320 and step S1340 may be made using only the first determination condition or the second determination condition.

In the case where the travel speeds (VdR and VdL) of the walking assist device 10 and the walking speed of the user are the same, the evaluation speed Vhfd in the forward direction and the evaluation speed Vhbd in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed Vhfd in the forward direction is larger than the magnitude of the evaluation speed Vhbd in the rearward direction because of the difference between the walking speed of the user and the travel speed of the walking assist device 10. In the case where the travel speed of the walking assist device 10 is higher than the walking speed of the user, the magnitude of the evaluation speed Vhfd in the forward direction is smaller than the magnitude of the evaluation speed Vhbd in the rearward direction because of the difference between the walking speed of the user and the travel speed of the walking assist device 10. The drive control unit 40 increases the travel speeds (VdR and VdL) of the walking assist device 10 in the case where the travel speeds (VdR and VdL) of the walking assist device 10 are lower than the walking speed of the user, and decreases the travel speeds of the walking assist device 10 in the case where the travel speeds of the walking assist device 10 are higher than the walking speed of the user. Consequently, travel of the walking assist device 10 of the walker can be controlled appropriately in accordance with the speed of front-rear arm swing by the user by correcting the deviation between the travel speed of the walking assist device 10 and the walking speed of the user.

FIG. 16 illustrates mode transition conditions for transitioning among the operation modes on the basis of the body state, the atmospheric state, and the vehicle body state. FIG. 17 illustrates conditions for transitioning to the various operation modes in the case where the operation mode is automatically switched. In the case where the automatic mode switching unit switch 76b is on, the drive control unit 40 determines the operation mode in accordance with the conditions indicated in FIGS. 9, 16, and 17 in step S200 (determination of the operation mode based on each acquired state) in FIG. 10A on the basis of information selected using the manual mode switching unit 76a.

In the case where one of conditions S1 to S6 is met, the drive control unit 40 changes the operation mode to an operation mode corresponding to the condition. In FIGS. 16 and 17, the symbol "-" indicates that the state may be either "0" or "1".

In FIG. 16, the mode transition conditions are determined on the basis of the body state, the atmospheric state, and the vehicle body state. The drive control unit 40 determines the mode transition condition as "1=without abnormality" only in the case where all the states are "1", and as "0=with abnormality" in the case where any of the conditions is "0".

Examples of the body state include the heart rate and the body temperature of the user. The drive control unit 40 compares the heart rate and the body temperature which are acquired by the heart rate/body temperature sensors 27a and 27b with predetermined values stored in advance in the storage unit 44, and determines the body state as "abnormal=0" in the case where such predetermined values are exceeded, and as "normal=1" otherwise.

Examples of the atmospheric state include the outside temperature. The drive control unit 40 compares the outside temperature which is acquired by the outside temperature sensor 54 with a predetermined value stored in advance in the storage unit 44, and determines the atmospheric state as "uncomfortable=0" in the case where such a predetermined value is exceeded, and as "comfortable=1" otherwise.

Examples of the vehicle body state include the inclination of the vehicle body, an impact on the vehicle body (variations in the acceleration applied to the body), the walking distance, and the walking time. The drive control unit 40 compares information acquired by the three-axis acceleration/angular speed sensor 52 with a predetermined value stored in advance in the storage unit 44, and determines the inclination of the vehicle body as "yes=0" in the case where the inclination of the vehicle body exceeds such a predetermined value, and as "no=1" otherwise. The drive control unit 40 compares information acquired by the three-axis acceleration/angular speed sensor 52 with a predetermined condition stored in advance in the storage unit 44, and determines an impact on the vehicle body as "yes=0" in the case where such a condition is met, and as "no=1" otherwise.

The drive control unit 40 determines the walking distance as "long=0" on the basis of a history of the walking distance stored in the storage unit 44 in the case where the walking distance is longer than a predetermined distance, and as "short=1" otherwise. The drive control unit 40 determines the walking time as "long=0" on the basis of a history of the walking time stored in the storage unit 44 in the case where the walking time is longer than a predetermined time, and as "short=1" otherwise.

In FIG. 17, the drive control unit 40 switches between the assist mode 1 (AM1) and the training mode 4 (TR4), between the assist mode 2 (AM2) and the training mode 3 (TR3), or between the training mode 1 (TR1) and the training mode 2 (TR2) in FIG. 8 on the basis of the conditions S1 to S6.

The condition S1 and the condition S2 are conditions for switching determination of the operation mode between the training mode 1 (TR1) and the training mode 2 (TR2). In the case where the manual mode switching unit 76a selects the "training mode 1", the moving handle grasping state is "1=grasped", the arm swing state is "1=with arm swing", the fixed handle grasping state is "0=not grasped", and the mode transition condition is "1=without abnormality", the condition S1 is met, and the drive control unit 40 causes the operation mode to transition from the training mode 2 (TR2) to the training mode 1 (TR1). In the case where the manual mode switching unit 76a selects the "training mode 1", the moving handle grasping state is "1=grasped", the arm swing state is "1=with arm swing", the fixed handle grasping state is "0=not grasped", and the mode transition condition is "0=with abnormality", the condition S2 is met, and the drive control unit 40 causes the operation mode to transition from the training mode 1 (TR1) to the training mode 2 (TR2).

The condition S3 and the condition S4 are conditions for switching determination of the operation mode between the assist mode 2 (AM2) and the training mode 3 (TR3). In the case where the manual mode switching unit 76a selects the "training mode 3", the moving handle grasping state is "1=grasped", the arm swing state is "0=without arm swing", the fixed handle grasping state is "0=not grasped", and the mode transition condition is "1=without abnormality", the condition S3 is met, and the drive control unit 40 causes the operation mode to transition from the assist mode 2 (AM2) to the training mode 3 (TR3). In the case where the manual mode switching unit 76a selects the "training mode 3", the moving handle grasping state is "1=grasped", the arm swing state is "0=without arm swing", the fixed handle grasping state is "0=not grasped", and the mode transition condition is "0=with abnormality", the condition S4 is met, and the drive control unit 40 causes the operation mode to transition from the training mode 3 (TR3) to the assist mode 2 (AM2).

The condition S5 and the condition S6 are conditions for switching determination of the operation mode between the assist mode 1 (AM1) and the training mode 4 (TR4). In the case where the manual mode switching unit 76a selects the "training mode 3", the moving handle grasping state is "0=not grasped", the arm swing state is "0=without arm swing", the fixed handle grasping state is "1=grasped", and the mode transition condition is "1=without abnormality", the condition S5 is met, and the drive control unit 40 causes the operation mode to transition from the assist mode 1 (AM1) to the training mode 4 (TR4). In the case where the manual mode switching unit 76a selects the "training mode 3", the moving handle grasping state is "0=not grasped", the arm swing state is "0=without arm swing", the fixed handle grasping state is "1=grasped", and the mode transition condition is "0=with abnormality", the condition S6 is met, and the drive control unit 40 causes the operation mode to transition from the training mode 4 (TR4) to the assist mode 1 (AM1).

As described above, in the case where the travel speed of the walking assist device 10 and the walking speed of the user are the same, the evaluation speed in the forward direction and the evaluation speed in the rearward direction are the same given that the magnitudes of the speeds of front-rear arm swing by the user are the same as each other. In the case where the travel speed of the walking assist device 10 is lower than the walking speed of the user, on the other hand, the magnitude of the evaluation speed in the forward direction is larger than the magnitude of the evaluation speed in the rearward direction because of the difference between the walking speed of the user and the travel speed of the walking assist device 10. In the case where the travel speed of the walking assist device 10 is higher than the walking speed of the user, the magnitude of the evaluation speed in the forward direction is smaller than the magnitude of the evaluation speed in the rearward direction because of the difference between the walking speed of the user and the travel speed of the walking assist device 10. The drive control unit 40 increases the travel speed of the walking assist device 10 in the case where the travel speed of the walking assist device 10 is lower than the walking speed of the user, and decreases the travel speed of the walking assist device 10 in the case where the travel speed of the walking assist device 10 is higher than the walking speed of the user. Consequently, travel of the walking assist device 10 of the walker can be controlled appropriately in accordance with the speed of front-rear arm swing by the user by correcting the deviation between the travel speed of the walking assist device 10 and the walking speed of the user.

Even in the case where a failure is caused in one of the movable handles, the target travel speed for the walking assist device 10 can be set on the basis of the other movable handle, and the deviation between the travel speed of the walking assist device 10 and the walking speed of the user can be corrected.

Next, the process procedure according to a second embodiment in the process procedure for the drive control unit 40 will be described with reference to FIGS. 18 to 21. In the process procedure according to the first embodiment discussed above, the drive units 64R and 64L are controlled on the basis of the movement speeds of the movable handles 20R and 20L in the training mode 1 and the training mode 2 illustrated in FIG. 8. In the process procedure according to the second embodiment to be described below, the drive units 64R and 64L are controlled on the basis of the positions of the movable handles 20R and 20L in the training mode 1 and the training mode 2 illustrated in FIG. 8. Differences from the process procedure according to the first embodiment will be mainly described below.

Figure 18A:
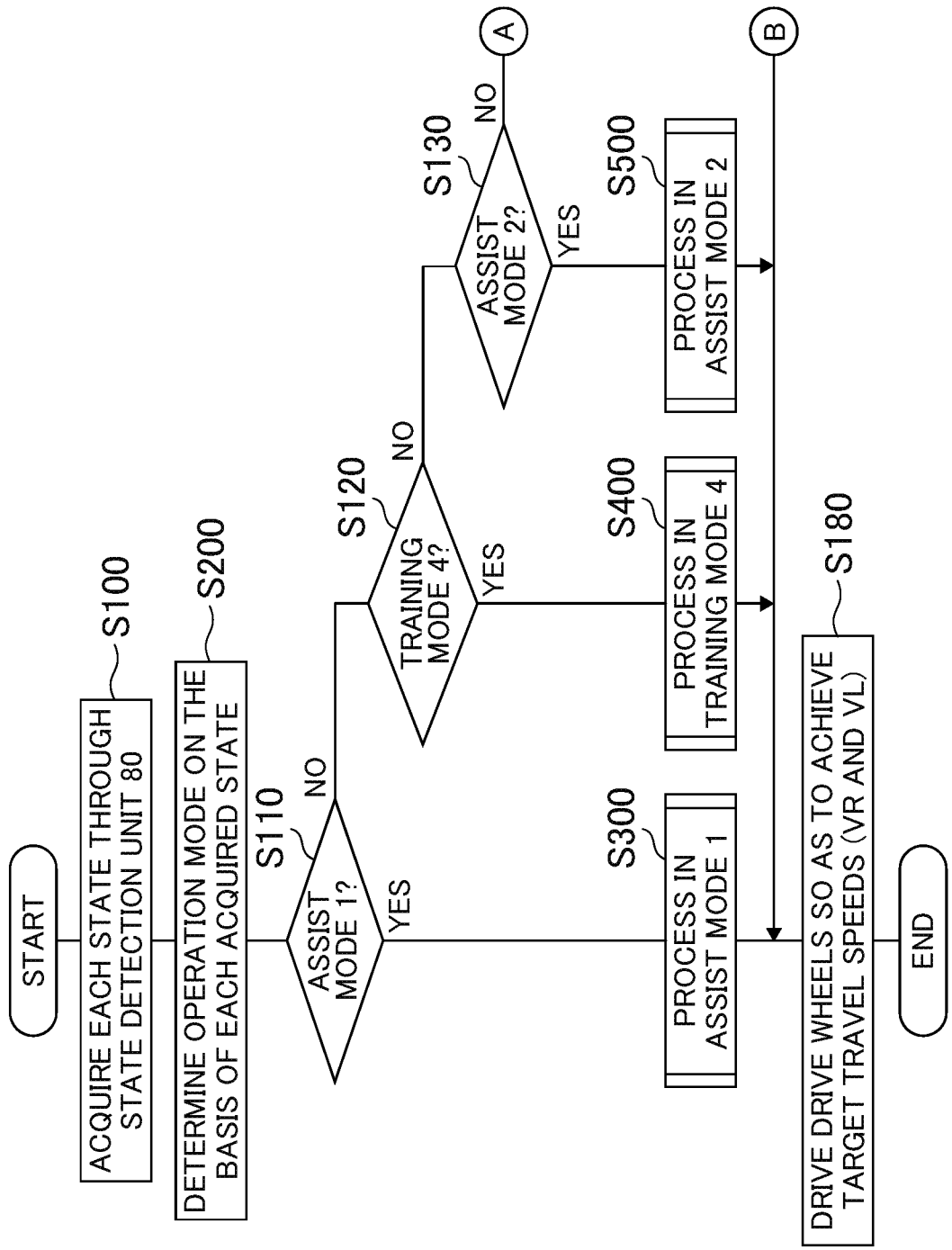
FIG. 18A is a flowchart illustrating the procedure of the overall process in a drive control unit of a walking assist device according to a second embodiment.
Figure 18B:
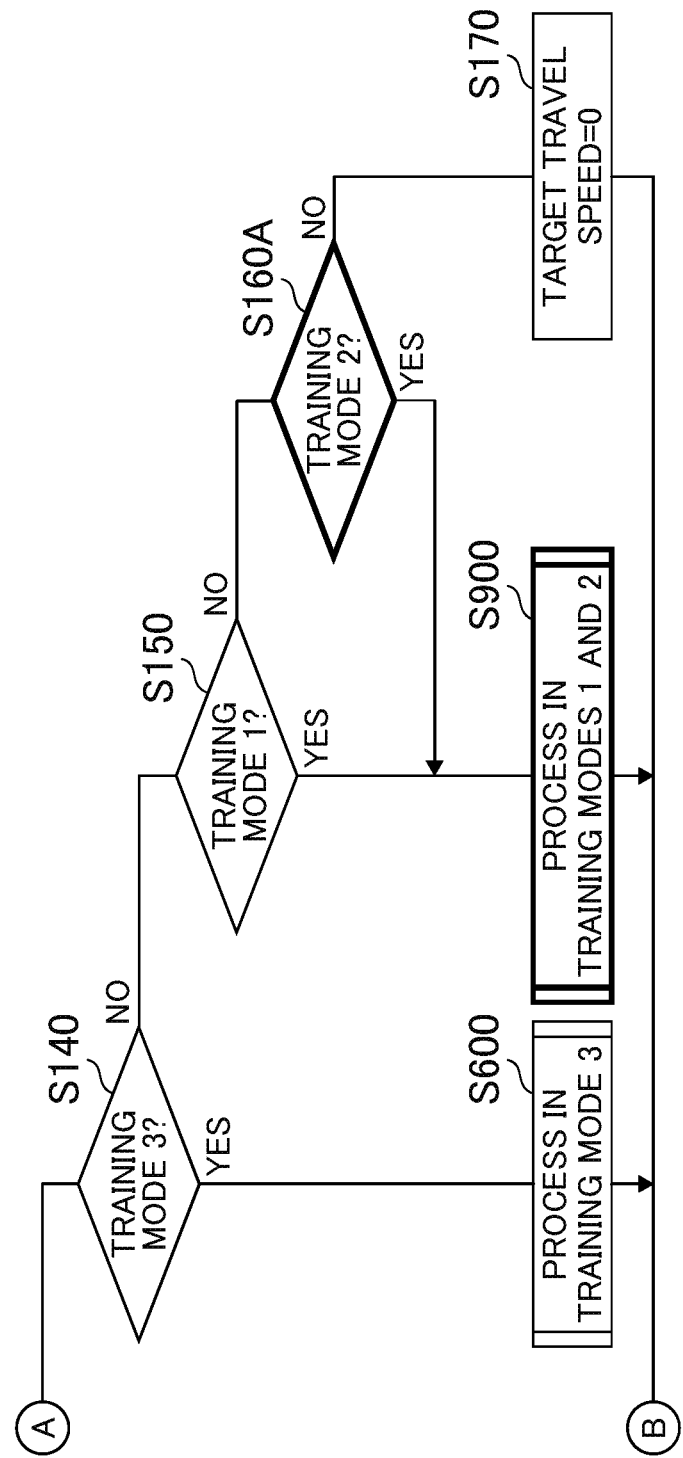
FIG. 18B is a flowchart illustrating the procedure of the overall process in a drive control unit of a walking assist device according to a second embodiment.

FIG. 18A and FIG. 18B are flowcharts illustrating the overall process of the process procedure according to the second embodiment. The flowchart according to the second embodiment illustrated in FIG. 18B differs from the flowchart according to the first embodiment illustrated in FIG. 10B in step S160A and step S900, and is the same as the flowchart according to the first embodiment in the other steps. The process procedure according to the second embodiment is executed at intervals of a predetermined time (e.g. at intervals of several milliseconds) as with the process procedure according to the first embodiment.

In the case where the process proceeds to step S150, the drive control unit 40 proceeds to step S900 in the case where the determined operation mode is the training mode 1 (TR1) (Yes), and proceeds to step S160A in the case where the determined operation mode is not the training mode 1 (TR1) (No).

In the case where the process proceeds to step S160A, the drive control unit 40 proceeds to step S900 in the case where the determined operation mode is the training mode 2 (TR2) (Yes), and proceeds to step S170 in the case where the determined operation mode is not the training mode 2 (TR2) (No).

Figure 19A:
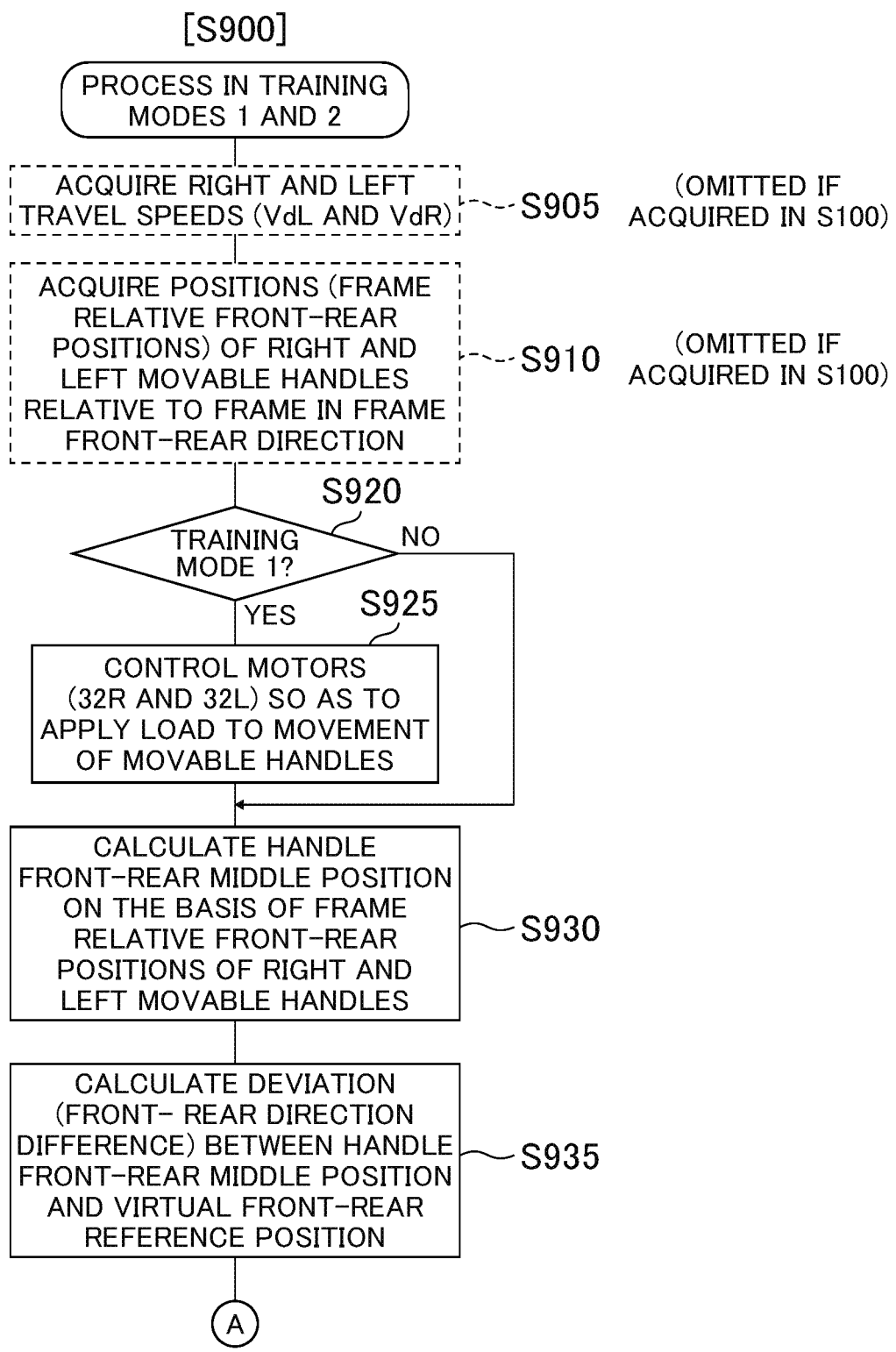
FIG. 19A is a flowchart illustrating the procedure of processes [S900] in the training modes 1 and 2 in the drive control unit of the walking assist device.
Figure 19B:
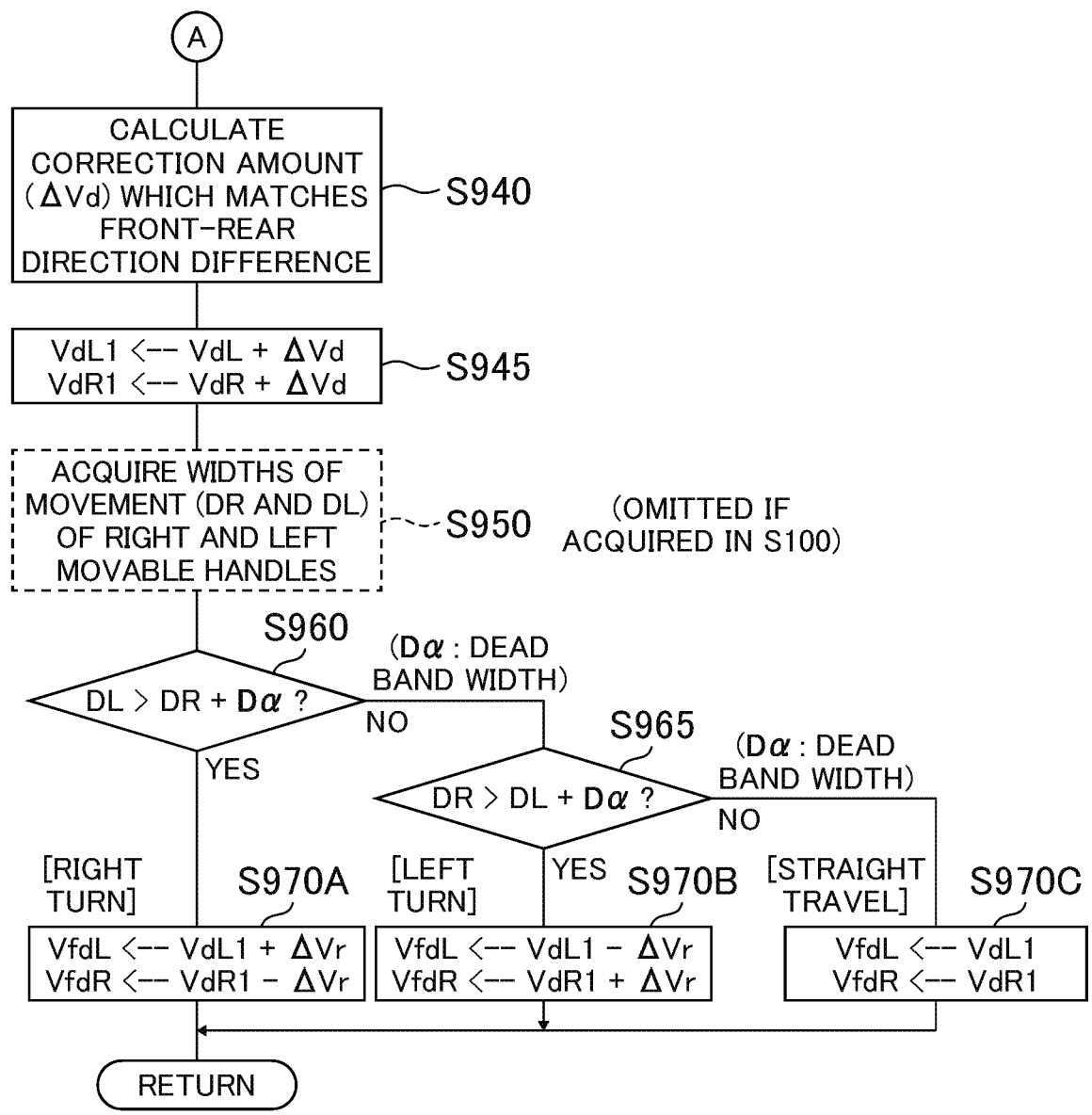
FIG. 19B is a flowchart illustrating the procedure of processes [S900] in the training modes 1 and 2 in the drive control unit of the walking assist device.

In the case where the process proceeds to step S900, the drive control unit 40 executes the processes in [S900] illustrated in FIG. 19A and FIG. 19B, thereafter returns to the overall process, and proceeds to step S180.

FIG. 19A and FIG. 19B are flowcharts illustrating the procedure of processes in the training mode 1 (TR1) and the training mode 2 (TR2) in the drive control unit 40 of the walking assist device 10 (see FIG. 8). The procedure for calculating the (right) target forward travel speed (VfdR) and the (left) target forward travel speed (VfdL) in the case of forward travel of the walking assist device 10 will be described below.

In step S905, the drive control unit 40 acquires the current (right) travel speed (VdR) and (left) travel speed (VdL) of the walking assist device 10 on the basis of detection signals from the travel speed acquisition units 56R and 56L (see FIG. 7), and proceeds to step S910. In the case where the (right) travel speed (VdR) and the (left) travel speed (VdL) are acquired in step S100, step S905 may be omitted.

In step S910, the drive control unit 40 acquires a (right) frame relative front-rear position (PmR) (see FIG. 20), which is the position of the (right) movable handle 20R relative to the frame, on the basis of a detection signal from the right handle position detection unit 34R (see FIG. 2). The drive control unit 40 acquires a (left) frame relative front-rear position (PmL) (see FIG. 20), which is the position of the (left) movable handle 20L relative to the frame, on the basis of a detection signal from the left handle position detection unit 34L (see FIG. 2), and proceeds to step S920. In the case where the (right) frame relative front-rear position (PmR) is defined as a position that is a distance LR away toward the rear from a frame front-rear reference position (Po) and the (left) frame relative front-rear position (PmL) is defined as a position that is a distance LL away toward the rear from the frame front-rear reference position (Po), the drive control unit 40 can acquire the (right) frame relative front-rear position (PmR) and the (left) frame relative front-rear position (PmL) as follows. In the case where the (right) frame relative front-rear position (PmR) and the (left) frame relative front-rear position (PmL) are acquired in step S100, step S910 may be omitted.

As illustrated in FIG. 2, the right handle position detection unit 34R is an encoder provided to the motor 32R (corresponding to the electric motor), for example, and the left handle position detection unit 34L is an encoder provided to the motor 32L (corresponding to the electric motor), for example. Such encoders are each a phase detection unit that detects the phase (rotational angle) of the drive shaft of the motor. The drive shaft of each of the motors 32R and 32L is rotated in accordance with movement of each of the movable handles 20R and 20L in the frame front-rear direction.

Figure 20:
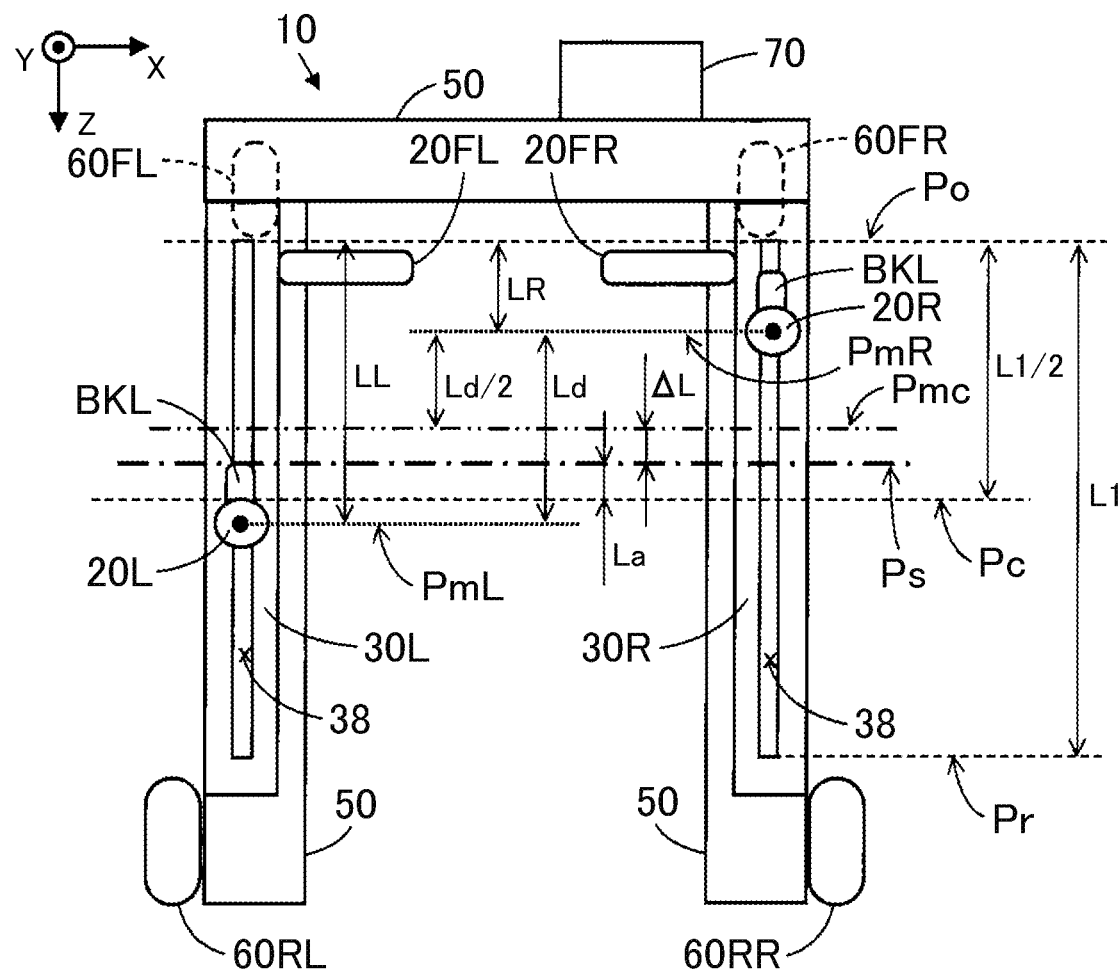
FIG. 20 is a plan view of the walking assist device, illustrating the frame relative front-rear position, the handle front-rear middle position, the virtual front-rear reference position, etc.

FIG. 20 illustrates the walking assist device 10 as seen from the above, and illustrates the frame front-rear reference position (Po), the frame relative front-rear position (PmR) of the (right) movable handle 20R, the frame relative front-rear position (PmL) of the (left) movable handle 20L, a virtual front-rear reference position (Ps), a handle front-rear middle position (Pmc), and a middle position (Pc) of the movable range (rail slit portions 38). For example, the frame front-rear reference position (Po) is set to the front-end position of the movable range (rail slit portions 38) of the movable handles 20R and 20L in the frame front-rear direction which is the front-rear direction of the frame. When the distance from the frame front-rear reference position (Po), which is the front-end position of the movable range (rail slit portions 38), to a rear-end position (Pr) of the movable range is defined as a distance L1, the middle position (Pc) of the movable range is a position that is a distance L1/2 away toward the rear from the frame front-rear reference position (Po). The virtual front-rear reference position (Ps) is set to a position (corresponding to the predetermined position) that is a predetermined distance La away toward the front from the middle position (Pc) of the movable range (Pc).

The drive control unit 40 can calculate the distance of movement of the (right) movable handle 20R within the movable range on the basis of the phase (i.e. the rotational angle) of the drive shaft of the motor 32R (see FIG. 2), which is calculated on the basis of a detection signal from the right handle position detection unit 34R (see FIG. 2).

Similarly, the drive control unit 40 can calculate the distance of movement of the (left) movable handle 20L within the movable range on the basis of the phase (i.e. the rotational angle) of the drive shaft of the motor 32L (see FIG. 2), which is calculated on the basis of a detection signal from the left handle position detection unit 34L (see FIG. 2).

In the example in FIG. 20, for example, the drive control unit 40 can detect that the distance of movement of the (right) movable handle 20R toward the rear from the frame front-rear reference position (Po) is the distance LR. In this case, the drive control unit 40 can recognize the (right) frame relative front-rear position (PmR), which is the position of the (right) movable handle 20R relative to the frame in the frame front-rear direction, as a position that is the distance LR away toward the rear from the frame front-rear reference position (Po). In the example in FIG. 20, similarly, the drive control unit 40 can recognize the (left) frame relative front-rear position (PmL) as a position that is the distance LL away toward the rear from the frame front-rear reference position (Po).

In the case where the distance in the front-rear direction between the (right) frame relative front-rear position (PmR) and the (left) frame relative front-rear position (PmL) is defined as a distance Ld as illustrated in FIG. 20, the middle position between the (right) frame relative front-rear position (PmR) and the (left) frame relative front-rear position (PmL) in the frame front-rear direction is defined as the handle front-rear middle position (Pmc). As illustrated in FIG. 20, the handle front-rear middle position (Pmc) is a position that is the distance LR+the distance Ld/2 away toward the rear from the frame front-rear reference position (Po). Since the distance Ld is represented as distance Ld=distance LL−distance LR, the distance LR+the distance Ld/2 is represented as distance LR+(distance LL−distance LR)/2=(distance LR+distance LL)/2. That is, the handle front-rear middle position (Pmc) is a position that is (distance LR+distance LL)/2 away toward the rear from the frame front-rear reference position (Po).

In the case where the process proceeds to step S920, the drive control unit 40 proceeds to step S925 in the case where the operation mode is the training mode 1 (Yes), and proceeds to step S930 in the case where the operation mode is not the training mode 1 (No).

In the case where the process proceeds to step S925, the drive control unit 40 controls the motors 32R and 32L so as to apply a load with a load amount derived by the load amount/assist amount change unit 74 to movement of the movable handles 20R and 20L, as in step S710, and proceeds to step S930.

In the case where the process proceeds to step S930, the drive control unit 40 calculates the handle front-rear middle position (Pmc) on the basis of the (right) frame relative front-rear position (PmR) and the (left) frame relative front-rear position (PmL) as discussed above, and proceeds to step S935.

In step S935, the drive control unit 40 calculates a front-rear direction difference (ΔL) which is the difference in the frame front-rear direction between the handle front-rear middle position (Pmc) and the virtual front-rear reference position (Ps) which is indicated in FIG. 20, and proceeds to step S940. The front-rear direction difference (ΔL) is represented as front-rear direction difference (ΔL)=virtual front-rear reference position (Ps)(distance L1/2−predetermined distance La)−handle front-rear middle position (Pmc) ([distance LR+distance LL]/2). The handle front-rear middle position (Pmc) is on the front side with respect to the virtual front-rear reference position (Ps) in the case where the front-rear direction difference (ΔL) is "positive", and the handle front-rear middle position (Pmc) is on the rear side with respect to the virtual front-rear reference position (Ps) in the case where the front-rear direction difference (ΔL) is "negative".

Figure 21:
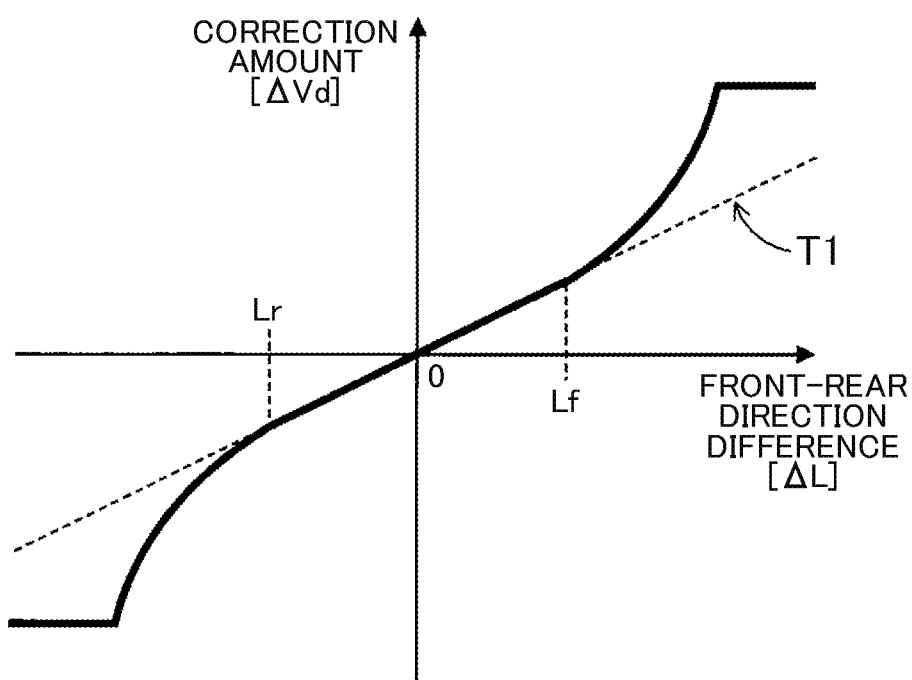
FIG. 21 illustrates an example of the front-rear direction difference/correction amount properties.

In step S940, the drive control unit 40 calculates a correction amount (ΔVd) on the basis of the front-rear direction difference (ΔL) and the front-rear direction difference/correction amount properties indicated in FIG. 21, and proceeds to step S945. The front-rear direction difference/correction amount properties are stored in the storage unit 44.

As indicated in FIG. 21, the front-rear direction difference/correction amount properties are set such that the correction amount (ΔVd) on the "positive" side (amount increase correction) becomes larger as the front-rear direction difference (ΔL) on the "positive" side becomes larger and the |correction amount| of the correction amount (ΔVd) on the "negative" side (amount decrease correction) becomes larger as the |front-rear direction difference (ΔL)| on the "negative" side becomes larger. In the front-rear direction difference/correction amount properties indicated in FIG. 21, in the case where the front-rear direction difference (ΔL) is within a predetermined range (Lr≤ΔL≤Lf in the example in FIG. 21), the correction amount (ΔVd) for the amount increase correction and the amount decrease correction is set to a proportional correction amount (a value along a proportional line T1) that is proportional to the front-rear direction difference (ΔL). In the front-rear direction difference/correction amount properties indicated in FIG. 21, in the case where the front-rear direction difference (ΔL) is outside the predetermined range (ΔL<Lr or Lf<ΔL in the example in FIG. 21), the correction amount (ΔVd) for the amount increase correction and the amount decrease correction is set to a value that is larger than the proportional correction amount (a value that is larger than the value along the proportional line T1).

With the front-rear direction difference/correction amount properties set as described above, in the case where the handle front-rear middle position (Pmc) is in the vicinity of the virtual front-rear reference position (Ps), the travel speed of the walking assist device 10 can be adjusted finely such that the handle front-rear middle position (Pmc) approaches the virtual front-rear reference position (Ps) relatively slowly. In the case where the handle front-rear middle position (Pmc) is significantly away from the virtual front-rear reference position (Ps), the travel speed of the walking assist device 10 can be adjusted such that the handle front-rear middle position (Pmc) approaches the virtual front-rear reference position (Ps) relatively quickly.

In step S945, the drive control unit 40 calculates and stores a (right) target travel speed (VdR1)=(right) travel speed (VdR)+correction amount (ΔVd), calculates and stores a (left) target travel speed (VdL1)=(left) travel speed (VdL)+correction amount (ΔVd), and proceeds to step S950. The (right) travel speed (VdR) and the (left) travel speed (VdL) correspond to the control amount.

In step S950, the drive control unit 40 acquires the width of movement (DR) of the (right) movable handle 20R in the front-rear direction, acquires the width of movement (DL) of the (left) movable handle 20L in the front-rear direction, and proceeds to step S960. In the case where the width of movement (DR) of the (right) movable handle 20R and the width of movement (DL) of the (left) movable handle 20L are are acquired in step S100, step S950 may be omitted.

In step S960, the drive control unit 40 determines whether or not the width of movement (DL) of the (left) movable handle 20L is larger than [width of movement (DR) of (right) movable handle 20R+dead band width (Dα)]. In the case where the width of movement (DL) is larger than [width of movement (DR)+dead band width (Dα)] (Yes), the process proceeds to step S970A. In the case where the width of movement (DL) is not larger than [width of movement (DR)+dead band width (Dα)] (No), the process proceeds to step S965. The dead band width (Dα) is set to a value that is appropriate for determination of a turn, and stored in the storage unit 44.

In the case where the process proceeds to step S965, the drive control unit 40 determines whether or not the width of movement (DR) of the (right) movable handle 20R is larger than [width of movement (DL) of (left) movable handle 20L+dead band width (Dα)]. In the case where the width of movement (DR) is larger than [width of movement (DL)+dead band width (Dα)] (Yes), the process proceeds to step S970B. In the case where the width of movement (DR) is not larger than [width of movement (DL)+dead band width (Dα)] (No), the process proceeds to step S970C.

In the case where the process proceeds to step S970A, the drive control unit 40 calculates and stores the (right) target forward travel speed (VfdR)=(right) target travel speed VdR1)−turn correction amount (ΔVr), calculates and stores the (left) target forward travel speed (VfdL)=(left) target travel speed (VdL1)+turn correction amount (ΔVr), and returns to the overall process. The process in step S970A causes the walking assist device 10 to make a right turn. The turn correction amount (ΔVr) is set to a value that is appropriate for turn operation, and stored in the storage unit 44.

In the case where the process proceeds to step S970B, the drive control unit 40 calculates and stores the (right) target forward travel speed (VfdR)=(right) target travel speed VdR1)+turn correction amount (ΔVr), calculates and stores the (left) target forward travel speed (VfdL)=(left) target travel speed (VdL1)−turn correction amount (ΔVr), and returns to the overall process. The process in step S970B causes the walking assist device 10 to make a left turn.

In the case where the process proceeds to step S970C, the drive control unit 40 calculates and stores the (right) target forward travel speed (VfdR)=(right) target travel speed VdR1), calculates and stores the (left) target forward travel speed (VfdL)=(left) target travel speed (VdL1), and returns to the overall process.

In the case where the width of movement (DL) of the (left) movable handle 20L is larger than the width of movement (DR) of the (right) movable handle 20R (+dead band width (Dα)) in steps S960, S965, S970A, S970B, and S970C, the drive control unit 40 controls the drive units so as to cause the walking assist device 10 to make a right turn. In the case where the width of movement (DR) of the (right) movable handle 20R is larger than the width of movement (DL) of the (left) movable handle 20L (+dead band width (Dα)), the drive control unit 40 controls the drive units so as to cause the walking assist device 10 to make a left turn.

Figure 22:
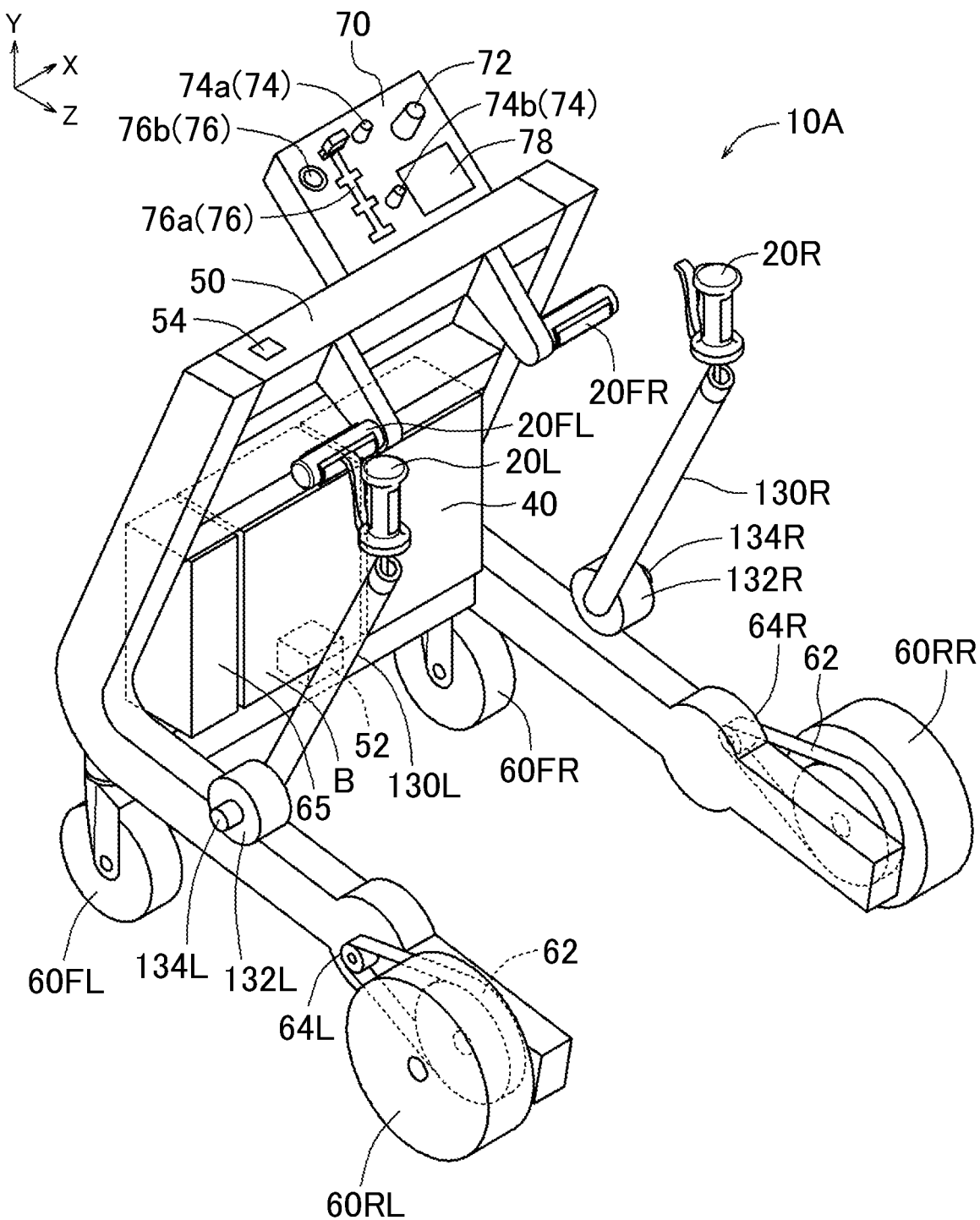
FIG. 22 illustrates an example of a walking assist device in which movable handles that are slidable in the front-rear direction have been changed to movable handles that are swingable in the front-rear direction.

The walking assist device 10 described above is structured such that the movable handles 20R and 20L are slidable back and forth along the rails 30R and 30L as illustrated in FIG. 1. In contrast, a walking assist device 10A illustrated in FIG. 22 is structured such that the movable handles 20R and 20L are swingable back and forth through arms 130R and 130L (corresponding to the handle guide units). Differences from the walking assist device 10 illustrated in FIG. 1 will be mainly described below.

In the walking assist device 10A illustrated in FIG. 22, the movable handle 20R is connected to a motor 132R (corresponding to the electric motor) via the arm 130R, and the movable handle 20L is connected to a motor 132L (corresponding to the electric motor) via the arm 130L. The motors 132R and 132L are fixed to the frame 50. The motor 132R is provided with a right handle position detection unit 134R which is a phase detection unit that can detect the phase of the drive shaft. The motor 132L is provided with a left handle position detection unit 134L which is a phase detection unit that can detect the phase of the drive shaft.

The drive shaft of each of the motors 132R and 132L is rotated in accordance with movement of each of the movable handles 20R and 20L in the frame front-rear direction. The right handle position detection unit 134R is an encoder, for example. The drive control unit 40 can detect the swing angle of the arm 130R, which is connected to the motor 132R, on the basis of a detection signal from the right handle position detection unit 134R. Similarly, the left handle position detection unit 134L is an encoder, for example. The drive control unit 40 can detect the swing angle of the arm 130L, which is connected to the motor 132L, on the basis of a detection signal from the left handle position detection unit 134L. The drive control unit 40 can calculate a frame relative front-rear position, a handle front-rear middle position, a front-rear direction difference, a correction amount, etc. on the basis of the swing angles of the arms 130R and 130L. The movable range of the movable handles 20R and 20L in the frame front-rear direction can be set by setting the movable range of the swing angles of the arms 130R and 130L. The frame front-rear reference position, the virtual front-rear reference position, the middle position of the movable range, etc. can also be set, which allows the process described according to FIG. 19A and FIG. 19B to be performed. The assist mode in which arm swing by the user is assisted, the training mode in which a load is applied to arm swing by the user, etc. can also be performed by actuating the motors 132R and 132L.

In the process procedure described according to the second embodiment, corrections can be made on the basis of the front-rear direction difference by updating the handle front-rear middle position each time the overall process is executed at intervals of several milliseconds. Thus, the travel speed of the walking assist device can be adjusted better in real time.

The walking assist device according to the present invention is not limited to the configuration, the structure, the shape, the process procedure, etc. described according to the present embodiment, and may be modified, added, and deleted in various ways without departing from the scope and spirit of the present invention.

In the present embodiment, the walking assist device is a four-wheeled vehicle with two drive wheels. However, the walking assist device may be a three-wheeled vehicle in which two, right and left, wheels serve as drive wheels and the remaining wheel serves as a caster wheel. The present invention is also applicable to a walking cart that assists a user in walking on his/her own, a cart that assists elderly people in walking and that can carry baggage, and a hand cart.

In the present embodiment, the evaluation speeds are calculated through integration. However, the evaluation speeds may be calculated by a different method.

What is claimed is:
1. A walking assist device comprising:
a frame;
a plurality of wheels provided at a lower end of the frame and including at least one drive wheel;

a drive unit that drives the drive wheel to cause the walking assist device to travel forward or rearward;

a battery that serves as a power source for the drive unit;

a drive control unit that controls the drive unit;

a pair of right and left movable handles that are grasped by a user and that are movable back and forth with respect to the frame in accordance with an arm swing performed during a walk of the user;

a handle guide unit provided on the frame to guide the movable handles in a movable range in accordance with the arm swing performed during the walk of the user; and a grasp portion state detection unit that detects a state of the movable handles, wherein the drive control unit controls a travel speed of the walking assist device by controlling the drive unit on the basis of the state of the movable handles which is detected using the grasp portion state detection unit.

2. The walking assist device according to claim 1, wherein the drive control unit calculates a frame relative front-rear position, which is a position of the movable handles with respect to the frame in a frame front-rear direction which is a front-rear direction of the frame, on the basis of the state of the movable handles which is detected using the grasp portion state detection unit, and controls the drive unit on the basis of the frame relative front-rear position which matches the arm swing by the user.

3. The walking assist device according to claim 2, wherein:

a virtual front-rear reference position is set at a predetermined position of the frame in the frame front-rear direction; and the drive control unit calculates a handle front-rear middle position which is at a middle in the frame front-rear direction between the frame relative front-rear position of the right movable handle and the frame relative front-rear position of the left movable handle, makes an amount increase correction on a control amount for the drive unit so as to increase the travel speed of the walking assist device in the case where the handle front-rear middle position is on a front side with respect to the virtual front-rear reference position, and makes an amount decrease correction on the control amount for the drive unit so as to decrease the travel speed of the walking assist device in the case where the handle front-rear middle position is on a rear side with respect to the virtual front-rear reference position.

4. The walking assist device according to claim 3, wherein the virtual front-rear reference position is set on the front side with respect to a middle position of the movable range in the frame front-rear direction.

5. The walking assist device according to claim 3, wherein the drive control unit makes a correction amount for the amount increase correction and the amount decrease correction larger as a front-rear direction difference, which is a difference in the frame front-rear direction between the handle front-rear middle position and the virtual front-rear reference position, is larger.

6. The walking assist device according to claim 5, wherein in the case where the front-rear direction difference is within a predetermined range, the correction amount for the amount increase correction and the amount decrease correction is set to a proportional correction amount that is proportional to the front-rear direction difference.

7. The walking assist device according to claim 6, wherein in the case where the front-rear direction difference is outside the predetermined range, the correction amount for the amount increase correction and the amount decrease correction is set to a correction amount that is larger than the proportional correction amount.

8. The walking assist device according to claim 2, wherein the drive control unit controls the drive unit so as to cause the walking assist device to make a left turn in the case where a width of movement of the right movable handle in the frame front-rear direction is larger than a width of movement of the left movable handle in the frame front-rear direction, and controls the drive unit so as to cause the walking assist device to make a right turn in the case where the width of movement of the left movable handle in the frame front-rear direction is larger than the width of movement of the right movable handle in the frame front-rear direction.

9. The walking assist device according to claim 2, wherein:

an electric motor is connected to each of the pair of right and left movable handles;

a drive shaft of each electric motor is rotated in accordance with movement of each movable handle in the frame front-rear direction;

each electric motor is provided with a phase detection unit that detects a phase of the drive shaft of the electric motor, the phase detection unit serving as the grasp portion state detection unit; and the drive control unit calculates the frame relative front-rear position on the basis of the phase of the drive shaft of each electric motor which is calculated on the basis of a detection signal from each phase detection unit.

10. The walking assist device according to claim 1, wherein the drive control unit controls the drive unit on the basis of a forward-direction evaluation speed, which is a speed of movement in a forward direction of the movable handles with respect to the frame, and a rearward-direction evaluation speed, which is a speed of movement in a rearward direction of the movable handles with respect to the frame, the forward-direction evaluation speed and the rearward-direction evaluation speed being calculated on the basis of the state of the movable handles which is detected using the grasp portion state detection unit.

11. The walking assist device according to claim 10, wherein the drive control unit controls the drive unit such that the forward-direction evaluation speed and the rearward-direction evaluation speed are equal to each other in the case where at least one of the movable handles is grasped.

12. The walking assist device according to claim 10, wherein the drive control unit controls the drive unit so as to cause the walking assist device to make a right turn in the case where a width of movement of the left movable handle in a frame front-rear direction, which is a front-rear direction of the frame, is larger than a width of movement of the right movable handle in the frame front-rear direction, and controls the drive unit so as to cause the walking assist device to make a left turn in the case where the width of movement of the right movable handle in the frame front-rear direction is larger than the width of movement of the left movable handle in the frame front-rear direction.

13. The walking assist device according to claim 10, wherein the drive control unit controls the drive unit so as to decrease the travel speed of the walking assist device in the case where the rearward-direction evaluation speed is higher than the forward-direction evaluation speed, and controls the drive unit so as to increase the travel speed of the walking assist device in the case where the forward-direction evaluation speed is higher than the rearward-direction evaluation speed.

14. The walking assist device according to claim 10, wherein the drive control unit controls the drive unit so as to increase the travel speed of the walking assist device in the case where it is determined on the basis of information from the grasp portion state detection unit that the movable handles are moved to a vicinity of a front end portion of the movable range in the handle guide unit during the arm swing performed during the walk of the user, and controls the drive unit so as to decrease the travel speed of the walking assist device in the case where it is determined that the movable handles are moved to a vicinity of a rear end portion of the movable range in the handle guide unit.

* * * * *